US012791447B2

(12) United States Patent
Cardin

(10) Patent No.: US 12,791,447 B2
(45) Date of Patent: Nov. 10, 2026

(54) HYBRID CAPILLARY/PACKED TRAP AND METHOD OF USE

(71) Applicant: Entech Instruments Inc., Simi Valley, CA (US)

(72) Inventor: Daniel B. Cardin, Simi Valley, CA (US)

(73) Assignee: Entech Instruments Inc., Simi Valley, CA (US)

( * ) Notice: Subject to any disclaimer, the term of this patent is extended or adjusted under 35 U.S.C. 154(b) by 401 days.

(21) Appl. No.: 18/617,574

(22) Filed: Mar. 26, 2024

(65) Prior Publication Data

US 2024/0264048 A1 Aug. 8, 2024

Related U.S. Application Data

(63) Continuation-in-part of application No. 16/526,838, filed on Jul. 30, 2019, now Pat. No. 12,158,454.

(60) Provisional application No. 62/712,699, filed on Jul. 31, 2018.

(51) Int. Cl.

| | |
|---|---|
| ***G01N 30/88*** | (2006.01) |
| ***G01N 1/22*** | (2006.01) |
| ***G01N 1/40*** | (2006.01) |
| ***G01N 30/16*** | (2006.01) |

(Continued)

(52) U.S. Cl.

CPC ........... *G01N 1/2202* (2013.01); *G01N 1/405* (2013.01); *G01N 30/16* (2013.01); *G01N 30/6078* (2013.01); *G01N 30/88* (2013.01); *G01N 2030/008* (2013.01); *G01N 2030/0095* (2013.01); *G01N 2030/8804* (2013.01)

(58) Field of Classification Search

CPC ............. G01N 30/88; G01N 2030/025; G01N 2030/8804

See application file for complete search history.

(56) References Cited

U.S. PATENT DOCUMENTS

| | | | |
|---|---|---|---|
| 2,985,007 | A | 5/1961 | Jan |
| 3,043,127 | A | 7/1962 | De et al. |
| 4,170,901 | A | 10/1979 | Conkle et al. |

(Continued)

FOREIGN PATENT DOCUMENTS

| | | | |
|---|---|---|---|
| CN | 2789754 | Y | 6/2006 |
| CN | 101793880 | A | 8/2010 |

(Continued)

OTHER PUBLICATIONS

Advisory Action received for U.S. Appl. No. 16/526,838, mailed on Mar. 15, 2023, 2 pages.

(Continued)

*Primary Examiner* — John E Breene
*Assistant Examiner* — Alex T Devito
(74) *Attorney, Agent, or Firm* — Kubota & Basol LLP

(57) ABSTRACT

A hybrid trap including a replaceable open-tubular capillary trap followed by a packed trap is used to collect, preconcentrate, and recover a sample, such as VOCs and SVOCs found in air. The capillary stage prevents losses and carry-over of the heavy fraction and can also collect the particles in air that contain the heavier SVOCs, also preventing them from reaching the packed stage. The packed stage traps lighter organic compounds that are not as prone to carryover due to channeling. The ionic species within the collected VOCs and SVOCs at the capillary trap can be converted to volatile compounds that allow gas chromatography-mass spectrometry.

23 Claims, 8 Drawing Sheets

(51) Int. Cl.
*G01N 30/60* (2006.01)
*G01N 30/00* (2006.01)

(56) References Cited

U.S. PATENT DOCUMENTS

| | | | |
|---|---|---|---|
| 4,213,326 | A | 7/1980 | Brodasky |
| 4,249,904 | A | 2/1981 | Reisch et al. |
| 4,300,393 | A | 11/1981 | Stearns |
| 4,583,394 | A | 4/1986 | Murakami et al. |
| 4,805,441 | A | 2/1989 | Sides et al. |
| 4,849,179 | A | 7/1989 | Reinhardt et al. |
| 5,081,871 | A | 1/1992 | Glaser |
| 5,089,124 | A | 2/1992 | Mahar et al. |
| 5,198,197 | A | 3/1993 | Clay et al. |
| 5,250,093 | A | 10/1993 | Jiang et al. |
| 5,288,310 | A | 2/1994 | Peters et al. |
| 5,347,844 | A | 9/1994 | Grob et al. |
| 5,363,707 | A | 11/1994 | Augenblick et al. |
| 5,465,607 | A | 11/1995 | Corrigan et al. |
| 5,496,741 | A | 3/1996 | Pawliszyn |
| 5,711,786 | A | 1/1998 | Hinshaw |
| 5,792,423 | A | 8/1998 | Markelov |
| 5,847,291 | A | 12/1998 | Green et al. |
| 5,866,004 | A | 2/1999 | Houck et al. |
| 5,900,532 | A | 5/1999 | Ikeda et al. |
| 5,952,557 | A | 9/1999 | Ikeda et al. |
| 6,177,008 | B1 | 1/2001 | Treiber et al. |
| 6,186,012 | B1 | 2/2001 | Kenny et al. |
| 6,351,983 | B1 | 3/2002 | Haas et al. |
| 6,395,560 | B1 | 5/2002 | Markelov |
| 6,484,560 | B1 | 11/2002 | Prest |
| 6,649,403 | B1 | 11/2003 | Mcdevitt et al. |
| 6,662,626 | B2 | 12/2003 | van der Maas |
| 6,677,129 | B1 | 1/2004 | Blume |
| 6,708,550 | B2 | 3/2004 | Mcgee et al. |
| 6,726,637 | B2 | 4/2004 | Phillips |
| 6,770,246 | B1 | 8/2004 | Husek |
| 6,814,785 | B2 | 11/2004 | Tipler et al. |
| 7,329,393 | B2 | 2/2008 | Backes et al. |
| 7,464,614 | B2 | 12/2008 | Harvey |
| 7,568,401 | B1 | 8/2009 | Berends, Jr. |
| 7,674,631 | B2 | 3/2010 | Pawliszyn |
| 7,700,045 | B2 | 4/2010 | Skarping et al. |
| 7,776,615 | B2 | 8/2010 | Yuka et al. |
| 8,182,768 | B2 | 5/2012 | Tipler et al. |
| 8,342,042 | B2 | 1/2013 | Scott et al. |
| 8,347,688 | B2 | 1/2013 | O'brien |
| 8,388,736 | B2 | 3/2013 | Marotta et al. |
| 8,404,185 | B2 | 3/2013 | Tipler et al. |
| 8,465,700 | B2 | 6/2013 | Huang |
| 8,561,484 | B2 | 10/2013 | Tipler et al. |
| 9,329,066 | B2 | 5/2016 | Skarping et al. |
| 9,404,900 | B2 | 8/2016 | Herman et al. |
| 9,733,225 | B2 | 8/2017 | Armstrong |
| 9,918,661 | B2 | 3/2018 | Cormier et al. |
| 10,502,664 | B2 | 12/2019 | Cardin |
| 10,835,155 | B2 | 11/2020 | Phillips |
| 10,849,600 | B2 | 12/2020 | Cardin |
| 10,866,166 | B2 | 12/2020 | Shaikh et al. |
| 2002/0020209 | A1 | 2/2002 | Grob et al. |
| 2002/0144949 | A1 | 10/2002 | Berger et al. |
| 2003/0190757 | A1 | 10/2003 | Furuno et al. |
| 2004/0072375 | A1 | 4/2004 | Gjerde et al. |
| 2005/0014156 | A1 | 1/2005 | Pawliszyn |
| 2005/0019950 | A1 | 1/2005 | Gierde et al. |
| 2005/0059162 | A1 | 3/2005 | Wohleb |
| 2005/0233085 | A1 | 10/2005 | Miller et al. |
| 2006/0073538 | A1 | 4/2006 | Konrad |
| 2006/0137432 | A1 | 6/2006 | Kin et al. |
| 2006/0286606 | A1 | 12/2006 | Oliver |
| 2007/0193871 | A1 | 8/2007 | Wiseman et al. |
| 2007/0284523 | A1 | 12/2007 | May et al. |
| 2008/0009761 | A1 | 1/2008 | Acker et al. |
| 2008/0064115 | A1 | 3/2008 | Hiramatsu et al. |
| 2008/0179252 | A1 | 7/2008 | Sasano et al. |
| 2009/0038374 | A1 | 2/2009 | Broz |
| 2009/0317916 | A1 | 12/2009 | Ewing et al. |
| 2010/0242579 | A1 | 9/2010 | Tipler et al. |
| 2011/0033949 | A1 | 2/2011 | Eum |
| 2011/0079143 | A1 | 4/2011 | Marotta et al. |
| 2011/0082380 | A1 | 4/2011 | Breen |
| 2011/0277563 | A1 | 11/2011 | Scott et al. |
| 2012/0160038 | A1 | 6/2012 | Wells et al. |
| 2012/0310113 | A1 | 12/2012 | Giddings et al. |
| 2013/0017545 | A1 | 1/2013 | Yong et al. |
| 2014/0060331 | A1 | 3/2014 | Peene et al. |
| 2014/0329705 | A1 | 11/2014 | Wong et al. |
| 2014/0345365 | A1 | 11/2014 | Aono et al. |
| 2015/0005657 | A1 | 1/2015 | Nijsen et al. |
| 2015/0075300 | A1 | 3/2015 | Hankemeier et al. |
| 2015/0276780 | A1 | 10/2015 | Bremer et al. |
| 2015/0364310 | A1 | 12/2015 | Musselman |
| 2016/0189945 | A1 | 6/2016 | Zhang et al. |
| 2017/0030892 | A1 | 2/2017 | Fu et al. |
| 2017/0261408 | A1 | 9/2017 | Cardin |
| 2017/0284978 | A1 | 10/2017 | Cardin |
| 2017/0303900 | A1 | 10/2017 | Cardin |
| 2018/0246071 | A1 | 8/2018 | Cardin |
| 2018/0372599 | A1 | 12/2018 | Cardin |
| 2019/0274588 | A1 | 9/2019 | Cardin |
| 2019/0329174 | A1 | 10/2019 | Khiavi |
| 2020/0033236 | A1 | 1/2020 | Shaikh et al. |
| 2020/0041469 | A1 | 2/2020 | Cardin |
| 2020/0191686 | A1 | 6/2020 | Cardin |
| 2020/0305849 | A1 | 10/2020 | Mamerow et al. |
| 2020/0378928 | A1 | 12/2020 | Cardin |
| 2021/0396629 | A1 | 12/2021 | Cognon et al. |
| 2022/0050085 | A1 | 2/2022 | Cardin |
| 2022/0381766 | A1 | 12/2022 | Cardin |
| 2023/0168163 | A1 | 6/2023 | Cardin |

FOREIGN PATENT DOCUMENTS

| | | | |
|---|---|---|---|
| CN | 202748263 | U | 2/2013 |
| CN | 202748340 | U | 2/2013 |
| CN | 203324233 | U | 12/2013 |
| CN | 104133031 | A | 11/2014 |
| CN | 104458970 | A | 3/2015 |
| CN | 104698064 | A | 6/2015 |
| CN | 105251238 | A | 1/2016 |
| CN | 105510090 | A | 4/2016 |
| CN | 105866272 | A | 8/2016 |
| CN | 106124255 | A | 11/2016 |
| CN | 107085046 | A | 8/2017 |
| CN | 108693261 | A | 10/2018 |
| CN | 109406231 | A | 3/2019 |
| EP | 0572968 | A2 | 12/1993 |
| EP | 0915329 | A2 | 5/1999 |
| EP | 1139087 | A2 | 10/2001 |
| EP | 2158469 | A2 | 3/2010 |
| EP | 2469261 | A1 | 6/2012 |
| EP | 2485035 | A2 | 8/2012 |
| EP | 3040721 | A1 | 7/2016 |
| GB | 2250633 | A | 6/1992 |
| JP | S57-24543 | U | 2/1982 |
| JP | H05-126699 | A | 5/1993 |
| JP | H05-506715 | A | 9/1993 |
| JP | H08-160024 | A | 6/1996 |
| JP | H10-185890 | A | 7/1998 |
| JP | 2000-2695 | A | 1/2000 |
| JP | 2002-236079 | A | 8/2002 |
| JP | 2002-328078 | A | 11/2002 |
| JP | 2004-53268 | A | 2/2004 |
| JP | 2004-93496 | A | 3/2004 |
| JP | 2005-510708 | A | 4/2005 |
| JP | 2005-338081 | A | 12/2005 |
| JP | 2007-514149 | A | 5/2007 |
| JP | 2008-111730 | A | 5/2008 |
| JP | 2010-96665 | A | 4/2010 |
| JP | 2015-197444 | A | 11/2015 |
| JP | 2016-126013 | A | 7/2016 |
| JP | 2019-508718 | A | 3/2019 |
| KR | 10-2004-0012068 | A | 2/2004 |
| RU | 2085907 | C1 | 7/1997 |

(56) References Cited

FOREIGN PATENT DOCUMENTS

| | | | |
|---|---|---|---|
| RU | 34739 | U1 | 12/2003 |
| SU | 817583 | A1 | 3/1981 |
| WO | 1991/015745 | A1 | 10/1991 |
| WO | 1994/028409 | A2 | 12/1994 |
| WO | 2002/086488 | A1 | 10/2002 |
| WO | 2005/057206 | A1 | 6/2005 |
| WO | 2008/020416 | A2 | 2/2008 |
| WO | 2008/157074 | A2 | 12/2008 |
| WO | 2008/157074 | A3 | 1/2010 |
| WO | 2011/031559 | A1 | 3/2011 |
| WO | 2011/143349 | A1 | 11/2011 |
| WO | 2016/107515 | A1 | 7/2016 |
| WO | 2017/156005 | A1 | 9/2017 |
| WO | 2018/013946 | A1 | 1/2018 |
| WO | 2018/160757 | A1 | 9/2018 |

OTHER PUBLICATIONS

Corrected Notice of Allowability received for U.S. Appl. No. 16/526,838, mailed on Nov. 6, 2024, 5 pages.
Corrected Notice of Allowance received for U.S. Appl. No. 15/450,236, mailed on Nov. 13, 2019, 2 pages.
Final Office Action received for U.S. Appl. No. 15/649,480, mailed on Mar. 24, 2020, 9 pages.
Final Office Action received for U.S. Appl. No. 16/526,838, mailed on Aug. 31, 2023, 10 pages.
Final Office Action received for U.S. Appl. No. 16/526,838, mailed on Dec. 19, 2022, 9 pages.
Final Office Action received for U.S. Appl. No. 17/399,469, mailed on Dec. 4, 2023, 15 pages.
International Search Report received for PCT Patent Application No. PCT/US2017/021167, mailed on Jun. 1, 2017, 5 pages.
International Search Report received for PCT Patent Application No. PCT/US2017/042172, mailed on Sep. 14, 2017, 4 pages.
International Search Report received for PCT Patent Application No. PCT/US2018/020313, mailed on May 28, 2018, 4 pages.
International Search Report received for PCT Patent Application No. PCT/US2019/020995, mailed on Jun. 11, 2019, 4 pages.
International Search Report received for PCT Patent Application No. PCT/US2019/044252, mailed on Nov. 11, 2019, 4 pages.
International Search Report received for PCT Patent Application No. PCT/US2021/045578, mailed on Nov. 22, 2021, 4 pages.
International Search Report received for PCT Patent Application No. PCT/US2022/072637, mailed on Nov. 3, 2022, 7 pages.
International Search Report received for PCT Patent Application No. PCT/US2022/080593, mailed on Feb. 28, 2023, 5 pages.
Non-Final Office Action received for U.S. Appl. No. 17/399,469, mailed on May 12, 2023, 19 pages.
Non-Final Office Action received for U.S. Appl. No. 15/450,236, mailed on Feb. 7, 2019, 16 pages.
Non-Final Office Action received for U.S. Appl. No. 15/649,480, mailed on Aug. 21, 2019, 18 pages.
Non-Final Office Action received for U.S. Appl. No. 15/908,491, mailed on Mar. 23, 2020, 12 pages.
Non-Final Office Action received for U.S. Appl. No. 16/294,325, mailed on Mar. 29, 2023, 12 pages.
Non-Final Office Action received for U.S. Appl. No. 16/526,838, mailed on Apr. 9, 2024, 6 pages.
Non-Final Office Action received for U.S. Appl. No. 16/526,838, mailed on Jun. 13, 2022, 10 pages.
Non-Final Office Action received for U.S. Appl. No. 16/526,838, mailed on May 25, 2023, 9 pages.
Non-Final Office Action received for U.S. Appl. No. 16/706,603, mailed on Aug. 18, 2022, 15 pages.
Non-Final Office Action received for U.S. Appl. No. 17/399,469, mailed on Jul. 2, 2024, 16 pages.
Non-Final Office Action received for U.S. Appl. No. 15/908,491, mailed on Dec. 4, 2020, 7 pages.
Notice of Allowance received for U.S. Appl. No. 15/450,236, mailed on Jun. 20, 2019, 8 pages.
Notice of Allowance received for U.S. Appl. No. 15/649,480, mailed on Jul. 24, 2020, 11 pages.
Notice of Allowance received for U.S. Appl. No. 16/294,325, mailed on Oct. 13, 2023, 8 pages.
Notice of Allowance received for U.S. Appl. No. 16/526,838, mailed on Aug. 29, 2024, 8 pages.
Restriction Requirement received for U.S. Appl. No. 15/908,491, mailed on Nov. 19, 2019, 7 pages.
Restriction Requirement received for U.S. Appl. No. 16/526,838, mailed on Mar. 9, 2022, 6 pages.
Search Report received for Chinese Patent Application No. 201780026386.5, mailed on Feb. 3, 2021, 4 pages (2 page of English Translation and 2 pages of Official Copy).
Search Report Received for Chinese Patent Application No. 201980051020.2 mailed on May 7, 2022, 8 Pages (4 Pages of English Translation and 4 Pages of Official Copy).
Anonymous,"Merlin MicroSeal Septumless GC Inlet Systems", Available online at: <https://www.hrgc.eu/merlin_microseal_introduction.htm>, retrieved on Oct. 31, 2019, 2014, pp. 1-4.
Dyne et al., "A Novel Device for Capturing Breath Samples for Solvent Analysis", Science of the Total Environment, vol. 199, No. 1-2, Jun. 1, 1997, pp. 83-89.
Entech Instruments,"Air Monitoring Sorbent Pens For Environmental and IH Applications", Available online at: <https://www.chimicacentro.itcataloghiEntech.Sorbent.Pens.pdf>, retrieved on Oct. 31, 2019, Dec. 31, 2017, pp. 1-15.
Hermann et al., "CGC Using A Programmable Electronic Pressure Controller", Journal of High Resolution Chromatography, vol. 13, No. 5, May 1990, pp. 361-365.
Ho et al., "Influences of Relative Humidities and Temperatures on the Collection of C2-C5 Aliphatic Hydrocarbons with Multi-Bed (Tenax TA, Carbograph 1TD, Carboxen 1003) Sorbent Tube Method", Atmospheric Environment, vol. 151, Dec. 5, 2016, pp. 45-51.
Pocurull et al., "Introduction of Large Volumes of Water-Containing Samples into a Gas Chromatograph", Journal Of Chromatography A, vol. 876, Nos. 1-2, Apr. 21, 2000, pp. 135-145.
Schubert et al., "CO2-controlled Sampling of Alveolar Gas in Mechanically Ventilated Patients", J. Appl Physiol, vol. 90, No. 2, Available online at: <https://doi.org/10.1152/jappl.2001.90.2.486>, Feb. 1, 2001, pp. 486-492.
Thomas et al., "A Canister-Based Method for Collection and GC/MS Analysis of Volatile Organic Compounds in Human Breath", Journal of Analytical Toxicology, vol. 15, No. 2, Mar./Apr. 1991, pp. 54-59.
Restriction Requirement received for U.S. Appl. No. 17/804,557, mailed on Nov. 27, 2024, 5 pages.

HYBRID CAPILLARY/PACKED TRAP AND METHOD OF USE

CROSS-REFERENCE TO RELATED APPLICATIONS

This application is a continuation-in-part of U.S. application Ser. No. 16/526,838, filed Jul. 30, 2019, entitled "HYBRID CAPILLARY/PACKED TRAP AND METHOD OF USE," which claims priority to U.S. Provisional Patent Application Ser. No. 62/712,699, filed Jul. 31, 2018, entitled "HYBRID CAPILLARY/PACKED TRAP FOR CHEMICAL ANALYSIS," the contents of which are hereby incorporated by reference for all purposes.

FIELD OF THE DISCLOSURE

This relates to a trapping system and, more particularly, a multi-stage trapping system including an open tubular capillary trap and a packed trap capable of capturing semi-volatile compounds from air.

BACKGROUND

Adsorbents can be used to collect organic compounds in gas phase samples. It has long been understood that using adsorbents (e.g., for air sample collection) followed by thermal desorption into a GC or GCMS can be effective for the analysis of volatile to semi-volatile compounds in the boiling point range of −50° C. to about 400° C., but recovery of 4-6 ring aromatic compounds and paraffinic compounds to C30 that boil higher than 400° C. have not been as successful. In addition, recovery of many thermally labile compounds such as Pesticides, Herbicides, and in general heteroatomic semi-volatile compounds containing not only Carbon and Hydrogen, but Oxygen, Nitrogen, Sulfur, Phosphorus, and Bromine and other atoms have also been unreliable using thermal desorption techniques due to the high temperatures required to get heavier compounds off of packed adsorbent traps.

One theory is that "channeling" of the adsorbents interferes with full recovery of these compounds. During the normal expansion and contraction of adsorbents during heating and cooling, channels are created in the sorbent. During trapping, while the sorbent is at a relatively cool temperature compared to the temperature during desorption, heavier compounds penetrate the gaps in the sorbent to an extent that is too great for effective or complete recovery during thermal desorption. Poor recovery not only affects the analytical accuracy due to run-to-run variability. The lack of recovery can cause these heavier compounds to "bleed" out of the adsorbent on subsequent analyses.

Heavier and more polar organics in the air are usually stuck to particles that do not allow them to interact with a packed sorbent in the way that individual molecules do. Many of these particles can be substantially inorganic, and may not be trapped by typical sorbents that are designed to interact with organic molecules, causing them to traverse deep into the trap such that they may not recovered be during thermal desorption. In addition, many of these compounds may exist as a salt on the collected particles, such as those that are acidic with a pKa ranging 0-3 (e.g., many PFAS acids used to make Teflon type materials), while air particles and aerosols generally have a pH range of 4-8. As the compounds of interest exist as a salt, even when trapped, they may not be recovered.

Due to these challenges of using thermal desorption traps (e.g., to recover a sufficiently wide range of GC compatible compounds in the air), the US EPA and others instead developed more laborious sample preparation methods utilizing sorbents (e.g., XAD-2 resins and Polyurethane Foam (PUF) cartridges) followed by solvent extraction rather than using a thermal desorption approach. In this case, even particles that traveled further into the sorbent can be recovered during the solvent extraction process. Solvent extraction of adsorbents, however, cause dilution of the sample, and use high-volume sampling devices that can have limited portability. In some cases, solvents are not able to completely recover all compounds from the adsorbents, as the collected compounds may be tightly bound to the adsorbent such that the solvents are ineffective at liberating them without using multiple extraction steps and potentially multiple solvents. Many of these techniques use large amount of solvent, often 0.1 to 1 liter per sample, which is very wasteful and which takes up a lot of space in the laboratory. After solvent extraction, most of the solvent must be removed through evaporation, so sample compounds lighter than Naphthalene are not recovered, but instead are lost to evaporation along with the solvent. Labs now have to invest in solvent recovery systems which are very expensive, yet still do not prevent some of the solvents from escaping into the environment. Solvents also produce health risks to chemists and to the environment, so creation of more "green" techniques has become a high priority for most environmental agencies world-wide. The US EPA has decided to ban the production of Methylene Chloride in the United States due to its carcinogenic and toxic properties, yet this is the solvent that is specified in most EPA sorbent extraction methods. Therefore, a new and less dangerous approach is needed.

Thus, there exists a need for a trapping technique with improved recovery of heavy and thermally labile compounds, better reproducibility, sensitivity, and portability, while eliminating the use of solvents to reduce the effects on both humans and on the Environment. Furthermore, there exists a need for a thermal desorption based solution that addresses the problem of recovering heavy and polar compounds that are stuck to particles in the air, while allowing a potential pH adjustment of the trapped particles prior to thermal desorption, maintaining good portability, and eliminating the use of solvents to reduce the effects on both humans and on the Environment.

SUMMARY

This relates to a trapping system and, more particularly, a multi-stage trapping system including an open tubular capillary trap and a packed trap capable of capturing semi-volatile compounds from air. The disclosed techniques use non-solvent based thermal desorption in a way that allows recovery of GC compatible compounds that are not recovered using classical packed adsorbent traps.

Some embodiments of the disclosure are directed to a trapping system that includes a packed stage and a capillary stage. The packed stage includes a packed sorbent bed. The capillary stage includes a capillary column, such as a WCOT (wall-coated open tubular) column or a PLOT (porous-layer open tubular) column. During sampling, a gas sample (e.g., air) is drawn first through the capillary stage and then through the packed stage. The capillary stage can trap particulates in the air and other heavy compounds, thereby preventing their transport to the downstream packed trap stage. It is understood that heavier semi-volatile compounds are adsorbed onto the particulate matter in the air, and the initial capillary trap effectively prevents these particles from reaching the packed traps (e.g., that were not designed to retain particles). Lighter compounds that traverse the capillary stage, primarily those compounds not already adsorbed onto larger particles, are trapped by the packed stage. To analyze the trapped compounds, the trapping device is inserted into a thermal desorption device and coupled to a chemical analysis system, such as a GC (gas chromatograph). Analysis can be conducted by a detector, such as an MS (mass spectrometer) or other detector.

Some embodiments of the disclosure are directed to a method of trapping and analyzing a gas sample, such as air. The sample is drawn through a trapping device that includes a capillary stage and a packed stage. After sample collection, the trapping device is inserted into a thermal desorption device coupled to a chemical analysis system (e.g., the trapping device is capped off to prevent any additional sampling or loss of collected compounds, and is delivered to a laboratory for analysis, and potentially to be stored in the lab until such time that they can be worked into the laboratories schedule. The trapping device (e.g., during analysis) is). The desorption device, trapping device, and sample are heated to a desorption temperature (e.g., 250-320° C. or 200-290° C.) before being transferred to a pre-column. A split port at the end of the pre-column opposite the desorption device allows bulk gases and water vapor to exit the system while heavier (e.g., SVOC, VOC) compounds are trapped on the pre-column. Then, the split port is closed and the compounds on the pre-column are transferred to another column for separation, followed by analysis by the detector. During transfer from the pre-column to the other column, another split port fluidly coupled to the trapping device is opened to allow compounds that did not transfer to the pre-column to exit the system, or to backflush extremely heavy compounds back off the precolumn.

After multiple (e.g., 5-20) uses, the capillary stage of the trapping device can be replaced (e.g., due to the build up of particles and aerosols onto the capillary stage of the trapping device). Additionally, the desorption device can include a replaceable liner that provides a clean flow path from the trapping device to the pre-column. Thus, replacing the capillary stage of the trapping device and/or the desorption device liner can improve the lifespan of the trapping device and desorption device, respectively, lowering the cost of maintenance and operation of these systems.

The capillary and packed traps together provide quantitative recovery of compounds boiling from as low as −50° C. to as high as 600° C. The sample can be directly desorbed onto the GC column, which avoids losses and contamination caused by other approaches that thermally desorb samples through transfer lines and rotary valves more remote to the GC oven.

As the capillary stage of the trapping device can also trap the ionic species within the collected VOCs and SVOCs at the capillary trap, some embodiments of the disclosure are directed to methods for converting the ionic species to their neutralized volatile form, allowing thermal desporption into gas chromatography-mass spectrometry.

DETAILED DESCRIPTION

Figure 1:
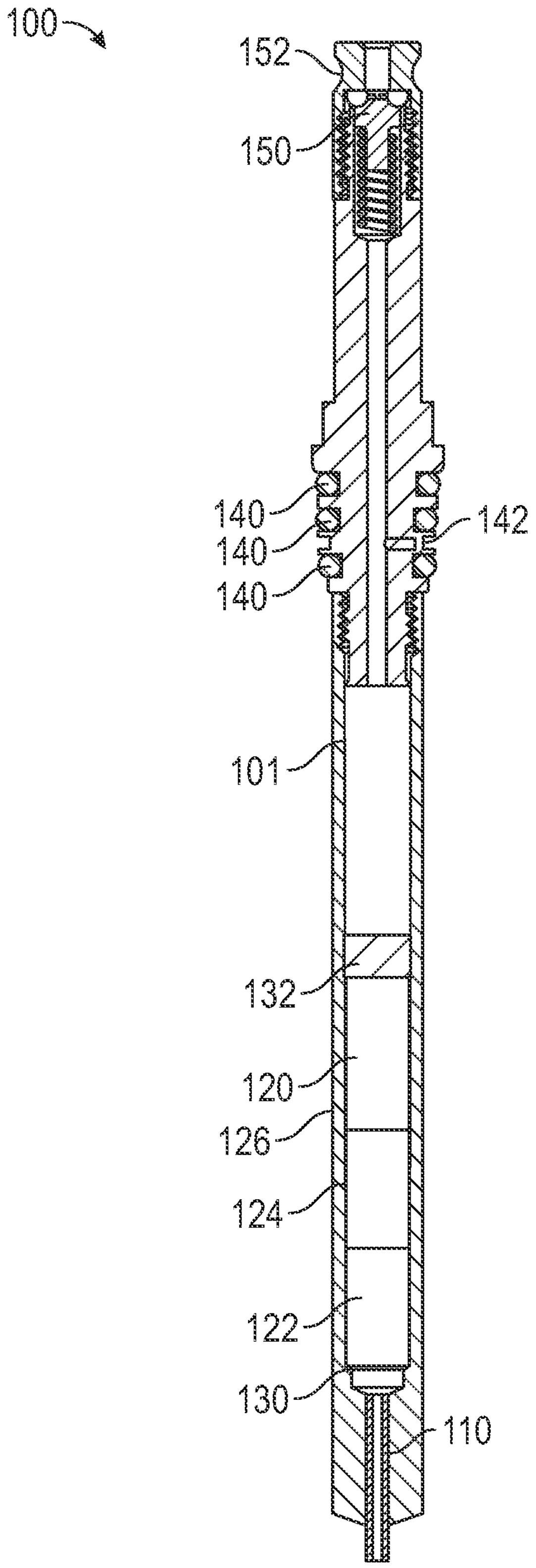
FIG. 1 illustrates a trapping device according to some embodiments of the disclosure.

This relates to a trapping system and, more particularly, a multi-stage trapping system including an open tubular capillary trap and a packed trap capable of capturing semi-volatile compounds from air. The disclosed techniques use non-solvent based thermal desorption in a way that allows recovery of GC compatible compounds that are not recovered using classical packed adsorbent traps.

Some embodiments of the disclosure are directed to a trapping system that includes a packed stage and a capillary stage. The packed stage includes a packed sorbent bed. The capillary stage includes a capillary column, such as a WCOT (wall-coated open tubular) column or a PLOT (porous-layer open tubular) column. During sampling, a gas sample (e.g., air) is drawn first through the capillary stage and then through the packed stage. The capillary stage can trap particulates in the air and other heavy compounds, thereby preventing their transport to the downstream packed trap stage. It is understood that heavier semi-volatile compounds are adsorbed onto the particulate matter in the air, and the initial capillary trap effectively prevents these particles from reaching the packed traps (e.g., due to the "tacky" nature of a polymer coated capillary column (WCOT)). It is also understood that compounds existing as salts due to their acidic nature while adsorbed onto neutral pH particles (pH range 5-8) are adsorbed onto the particulate matter in the air. Lighter compounds that traverse the capillary stage, primarily those compounds not already adsorbed onto larger particles, are trapped by the packed stage. To analyze the trapped compounds, the trapping device is inserted into a thermal desorption device and coupled to a chemical analysis system, such as a GC (gas chromatograph). During thermal desorption, the heavier compounds retained on the capillary stage can be more effectively recovered as they are closer to the exit of the trap, the linear velocity of the desorb gas is higher inside the entrance capillary than on the packed trap stage, which is much wider and is known to suffer from non-laminar flow due to non-perfect packing of the sorbent, and because of the channeling within the adsorbent bed. The increased velocity and laminar flow increases recovery of chemicals retained on the capillary entrance. Analysis can be conducted by a detector, such as an MS (mass spectrometer) or other detector.

Some embodiments of the disclosure are directed to a method of trapping and analyzing a gas sample, such as air. The sample is drawn through a trapping device that includes a capillary stage and a packed stage. After sample collection, the trapping device is inserted into a thermal desorption device coupled to a chemical analysis system. The desorption device, trapping device, and sample are heated to a desorption temperature (e.g., 250-320 or 200-290° C.) before being transferred to a pre-column. A split port at the end of the pre-column opposite the desorption device allows bulk gases and water vapor to exit the system while heavier (e.g., SVOC, VOC) compounds are trapped on the pre-column. Then, the split port is closed and the compounds on the pre-column are transferred to another column for separation, followed by analysis by the detector. During transfer from the pre-column to the other column, another split port fluidly coupled to the trapping device is opened to allow compounds that did not transfer to the pre-column to exit the system, or to backflush extremely heavy compounds back off the precolumn.

After multiple (e.g., 5-20) uses, the capillary stage of the trapping device can be replaced. Additionally, the desorption device can include a replaceable liner that provides a clean flow path from the trapping device to the pre-column. Thus, replacing the capillary stage of the trapping device and/or the desorption device liner can improve the lifespan of the trapping device and desorption device, respectively, lowering the cost of maintenance and operation of these systems.

Overview

A new approach for sampling volatile and semi-volatile compounds for thermal desorption analysis by GC or GCMS is presented. The problems associated with alternate trapping techniques are solved by placing a short capillary trap, such as either a WCOT (Wall Coated Open Tubular) column or a PLOT (Porous Layer Open Tubular) column, at the inlet of a packed trap. This capillary stage prevents heavier compounds from reaching the packed stage of the trap, but using a mechanism much different than simply using a weaker packed stage in a multi-bed packed trap.

A trapping device including a capillary column in fluid communication with a single- or multi-bed packed trap allows heavier semi-volatile compounds to be captured by the addition of the capillary stage for more effective recovery during thermal desorption. Particles in air can be retained by the capillary stage, which prevents non-volatile debris from entering the packed stage. In particular, a WCOT capillary column has a polymeric coating that causes particles to stick to the walls of the open tubular column, preventing the particles and the heavy organic compounds that are adsorbed onto the particles from reaching the packed trap. The open tubular nature of the capillary trap prevents channeling from occurring within the capillary column, as the capillary column has substantially the same open architecture whether the trap is hot or cool, making for a reliable and reproducible analytical device. Keeping the heavy, particle-bound compounds at the inlet of the trap, on a polymeric material that is much less adsorptive than most adsorbents found in packed traps, allows for the heavy compounds to be desorbed at much lower temperatures, and at higher linear velocities, due to the small cross sectional area of the capillary stage relative to the packed stage. These factors all add up to more effective recovery of both the lower volatility compounds, and the more thermally labile compounds. Finally, the non-volatile particles and debris that would otherwise reduce the lifetime of the downstream packed stage are prevented from reaching that stage, both during sampling and during thermal desorption analysis. The capillary stage can be replaced after several uses to regenerate a clean, particle-free flow path through the capillary stage without having to replace the entire sampling device.

The trapping system is typically used to collect from 0.01 to 10 liters of air (e.g., or more than 10 liters of indoor or outdoor air), followed by thermal desorption into a GC or GCMS system for analysis either using a field-portable GC/GCMS, or by delivery to a mobile or stationary laboratory. Although PUF cartridges and XAD-2 resins can be used to trap thousands of liters of sample, there is a typical 1000× dilution because only 1 μL of the final 1000 μL of solvent concentrate can be analyzed due to the negative effects in injecting larger amounts of solvent; namely back-expansion of the sample into the carrier gas delivery lines, which creates the need to disassemble and clean the contaminated GC injector assembly. The capillary stage improves recovery of heavier compounds by preventing them from exposure to the stronger adsorbent in the packed trap, and by maintaining a higher linear velocity during the desorption process to the GC or GCMS. Preventing exposure to the packed trap also reduces contamination of the packed trap and carryover of heavier compounds from run to run, which is a known problem when trying to analyze these heavy compounds with packed adsorbent traps. Finally, collection on the much weaker capillary trap allows recovery of heavy and thermally labile compounds at lower desorption temperatures, allowing the accurate analysis of many compounds known to be poorly recovered using packed traps alone.

An advantage of the disclosed trapping system is reducing the negative effects of channeling. Packed traps are completely filled with adsorbent, while capillary columns such as WCOT or PLOT columns just have the absorbent or adsorbent coated on the inner walls of the column. Thus, placing a capillary column at the inlet of the packed trap can prevent heavier compounds from being subjected to the channeling effect, whereby compounds are delivered further into the trapping media of packed traps than would otherwise be expected based on their high affinity to the adsorbent. In particular, heavier compounds already adsorbed onto particles may not stick to most adsorbents found in packed traps, allowing them to penetrate even further into the adsorbent, further reducing the recovery of compounds adsorbed onto the particles. Additionally, the possibility of migration of sample compounds heightens the importance of preventing particles from reaching the packed sorbents, as allowing these particles to migrate further into the packed sorbents could interfere with recovery during desorption and analysis. Thus, trapping particles and other heavy compounds with the capillary stage prevents these particles from contaminating the packed sorbent and ensures recovery of the compounds stuck to these particles during desorption and analysis.

Sorbents, including the sorbents used in packed traps, have a coefficient of thermal expansion that cause them to expand when heated and contract when cooled. During desorption, the sorbent can expand due to being heated to a high temperature. After desorption, such as during trapping, the sorbent can contract due to being cooled to a low temperature. Repeated heating and cooling cycles can cause channels to form in the sorbent when the sorbent is at a reduced temperature for trapping, allowing heavier compounds to become trapped within the channel and unable to escape during desorption (e.g., to flow further into the packed trap before coming in contact with the sorbent, due to the much higher flow rates through these channels as compared to through the smaller gaps between the sorbent particles where no channels exist), when the sorbent expands, which can close the channels. During desorption, the sorbents once again expand, making the recovery of the heavier compounds that were transported further into the packed traps more difficult, thereby requiring longer trap bakeouts to remove these heavier compounds before the next sampling event. In addition, the transport of packed traps to the sampling location may cause settling of the adsorbent in a way that causes channels to form along the inside walls of the tubing containing the adsorbent, causing further channeling and deeper penetration during sampling. Failure to eliminate heavy compounds from the trapped stage during desorption can not only compromise the chemical analysis results by reducing the detected quantity of the heavy compounds, but can also lead to contamination of the packed trap, as the heavy compounds may be desorbed during a subsequent use of the trap, thereby increasing the detected quantity of the heavy compounds during subsequent uses of the trap (e.g., causing a false, positive bias in the analytical results). The extent of channel formation and the exact structure of these channels (lots of small channels or a few larger ones) can create a wide variability when using classical packed traps, but keeping the heavier compounds from reaching these channels by using a hybrid capillary/packed trap can considerably improve the trap to trap consistency, which of course is important with any good analytical technique.

Per Poiseuille's Law, doubling of the inner diameter of a channel or column's inner diameter will increase the relative flow rate by the forth power of that increase. Thus, increasing the separation of the particles in a packed adsorbent trap, such as by channeling, by a factor of 2 will increase the flow rate through that channel by a factor of 16. At sampling flow rates well above the diffusion rates of gases at a particular temperature, chemicals can be introduced much further into the adsorbent through these channels before they come in contact with the sorbent. Heavier organic compounds will adhere so strongly to the sorbent that just a small increase in penetration can result in poor recoveries during thermal desorption. In addition, the greater penetration causes many thermally labile compounds to be retained long enough on the tube during thermal desorption at high temperatures that they decompose, and are therefore not measured accurately during analysis.

Although all compounds are subject to channeling within the packed trap stage, the heaviest compounds are most affected and will show the greatest losses during analysis, and the greatest potential for carry-over in subsequent analyses. Capillary columns, such as WCOT and PLOT columns, are not as susceptible to channeling as packed columns (e.g., or traps) because they only have a thin sorbent coating on the walls instead of the entire inside of the column being packed with sorbent, as is the case for packed columns (e.g., or traps). Capillary tubing that is open through the center does not close off when heated. For example, capillary columns with an inner diameter of 530 μm have a 1-20 μm coating on their inner walls, which leaves a pathway with an inner diameter of 490-528 μm completely open, which is 92% to over 99% of the inner diameter of the capillary tubes. During heating and cooling of capillary columns, the size of this opening remains approximately constant, eliminating the channeling (e.g., inconsistent internal geometries) that can occur in packed traps. This (e.g., preliminary capillary stage prior to the packed stage) greatly increases the consistency from analysis to analysis, and from sampler to sampler, because these capillary traps are usually used to make capillary columns, which today are extremely reproducible, so much more than packed columns, and their counterpart, the packed adsorbent trap. In addition, the volume of sorbent particles in a capillary column are typically 1000-5000 times smaller than the sorbent particles used in packed traps, as the use of larger sorbent particles in packed traps are required to create reasonably large gaps between the particles and therefore a reasonable flow rate through the packed trap during sampling. If much smaller particles are used in packed traps, the flow rate can drop to near zero, considering there is no open space to flow through. Therefore, a capillary column on the front of a packed trap offers both a compact design for sampling of organic compounds in air or other volatile matrices, while offering substantially improved recovery relative to other thermal desorption devices.

Another benefit of the disclosed system and method is particle management. To get an accurate measurement of semi-volatile compounds in air, collection of particulate matter is important, as a large fraction of heavier organics found in air are bound to these particles. These particles can stick to the polymer phase of the capillary column, allowing their capture and substantially preventing them from proceeding on to the packed stage of the trap. During thermal desorption, most particles do not have a strong adsorptive effect on chemical compounds, so the compounds (e.g., heavy volatile compounds, semi-volatile compounds, etc.) can be desorbed from the particles, allowing quantitative measurement of the compounds. After 5 to 20 samplings of air, the capillary section can be removed and replaced with a clean section of capillary at a fraction of the cost of replacing an entire trap. The ability to replace the capillary column provides an air monitoring solution that can last for up to hundreds of cycles of sampling and thermal desorption.

Finally, by placing a capillary trap at the entrance to a packed trap, complete recovery of compounds, including compounds having a boiling point of 600° C. can be accomplished at lower desorption temperatures. Although some methods demonstrate the ability to recover compounds out to C30 using conventional packed adsorbent traps, desorption temperatures as high as 400° C. have to be used, and then only compounds that are stable at this temperature can be recovered. By placing a capillary trap with its lower surface area and much lower adsorptive strength at the entrance of a packed trap, heavy compounds can be recovered at lower desorption temperatures (e.g., 250-320° C.), allowing more thermally labile compounds to also be recovered. In addition, when thermal degradation takes place, adsorbent-damaging free radicals can be produced, shortening the lifetime of the trapping device. Reducing the desorption temperature enables the recovery of more thermally labile compounds to achieve a more complete, comprehensive analysis, while vastly increasing the life time of the sampling device.

Collection of air in the field is performed by using either a vacuum pump with a known flow rate, or by using a vacuum reservoir where the volume collected can be determined by the change in vacuum within a reservoir of known volume. Since all or substantially all of the sample is thermally desorbed into the chemical analysis device (e.g., GC, GCMS, etc.), a typical dilution of 1000× found in solvent extraction techniques means that just a 1 liter volume of collected air using the new hybrid sampler can give equivalent sensitivity to that of 1000 liters of air collected onto PUF (Polyurethane Foam) or XAD-2 resins. In addition, the lack of laboratory processing means much faster analysis, and makes it possible to perform analysis in the field using portable GCs or mobile labs.

DESCRIPTION OF EMBODIMENTS

FIG. 1 illustrates a trapping device 100 according to some embodiments of the disclosure. Trapping device 100 includes a capillary stage 110 followed by a packed stage 120. The capillary stage 110 and packed stage 120 are fluidly coupled, and air that flows through the capillary stage 110 exits the capillary stage 110 to flow through the packed stage 120 during sample collection. The capillary stage 110 is a capillary column such as a PLOT column or WCOT column. The packed stage 120 includes a plurality of adsorbent beds 122-126 arranged from weak to strong in the sampling flow direction. That is to say, adsorbent bed 122 has a lower chemical affinity to one or more target compounds than adsorbent bed 124, which has a lower chemical affinity to one or more target compounds than adsorbent bed 126. In other words, adsorbent bed 126 is the strongest and adsorbent bed 122 is the weakest. In some embodiments, a different number of adsorbent beds, such as a single adsorbent bed or a different number of multiple adsorbent beds can be used for packed stage 120.

The capillary stage 110 is able to trap compounds with boiling points in the 400-600° C. range, while the packed stage 120 is able to collect compounds boiling from −50° C. to 400° C., depending on the adsorbents used. The small inlet diameter to the capillary stage 110 results in net diffusion rates that are virtually zero, so virtually no diffusion offset occurs when performing active sampling at flow rates as low as 0.2-1 cc/min. That is to say, trapping device 100 can be left uncapped with very little addition to the sample due to diffusion. Using slow, active sampling rates may be desirable when performing long term time integrated sampling, when average concentrations are desired, such as over a 1 day or 1 week period of time, or longer. In addition to trapping the heavier compounds, the capillary stage 110 will trap particulates, preventing their introduction into the packed stage 120.

The capillary stage 110 can either be a standard fused silica capillary column, or a coated metal column for enhanced durability. The diameter of the capillary stage 110 can be 0.01 inches to 0.04 inches in diameter or somewhat smaller or larger IDs can be used. The length of the capillary stage is in the range of 1 cm-10 cm, or 0.5 inches. The capillary stage 110 can be coupled to the packed stage 120 using a number of techniques, including a press fit, a threaded connection, a high temperature polymer connection or ceramic connection, and others. Due to the low mass of the capillary stage 110, very little retaining force is needed to keep it in place. After multiple (e.g., 5-20) uses (e.g., multiple cycles of sampling and thermal desorption into a GC or GCMS), the capillary stage 110 can be removed and replaced with a new capillary stage to eliminate the buildup of particles on the capillary stage 110. By replacing the capillary stage 110 after multiple uses, a new flow path into and out of the packed stage 120 is created, improving the adsorptive strength of the capillary stage 110 and preventing or reducing contamination of the packed stage 120.

The trapping device 100 further includes a screen 130 to maintain the sorbent in the packed stage 120, preventing direct exposure of the sorbent to the capillary stage 110. The adsorbent beds in the packed trap cannot be allowed to mix during transportation to and from the field. Thus, trapping device 100 includes a retaining frit 132 or other material to keep the sorbent 122-126 in place, preventing it from shifting within the body 101 of the trapping device. The packed stage 120 is typically ¼ inches in outer diameter, but other sizes are also possible. Additionally, trapping device 100 further includes screens between each bed of sorbents 122, 124, and 126 to keep each type of sorbent separate from the others. That is to say, there is a screen between sorbent 122 and 124 and a screen between sorbent 124 and sorbent 126.

The packed stage 120 can include one or multiple sorbents can be used depending on the desired volatility range of target compounds. Using a single adsorbent, compounds from 200-400° C. can be retained and recovered in the packed stage 120, which combined with the capillary stage 110 yields an overall boiling point range of 200-600° C. In some cases where recovery of even lighter compounds is desired, 2 or 3 adsorbent beds can be used, with screens inserted between each bed. In this case, the first bed after the capillary column is the weakest in strength, followed by beds of increasing strength or retention. The use of multiple sorbent beds allows recovery of even more volatile compounds without compromising recovery of 200-600° C. boiling point compounds retained on the weaker first packed adsorbent bed and inlet capillary stages.

The trapping device 100 also includes sealing o-rings 140, desorption port 142, and an integrated valve 150. The top of the trapping device 100 includes a detent 152 at which the trapping device 100 can be attached to a vacuum source during trapping. The o-rings 140 and integrated valve 150 can make sampling and analysis easier, and can help to automate the analysis using a robotic rail or other autosampler mounted on top of the GC or GCMS. However, the disclosure also includes tubes that are isolated using conventional compression fittings.

The details and functionality of o-rings 140, desorption port 142, and valve 150 during sampling, storage, and desorption will be described in more detail below with reference to FIGS. 2-3.

Figure 2:
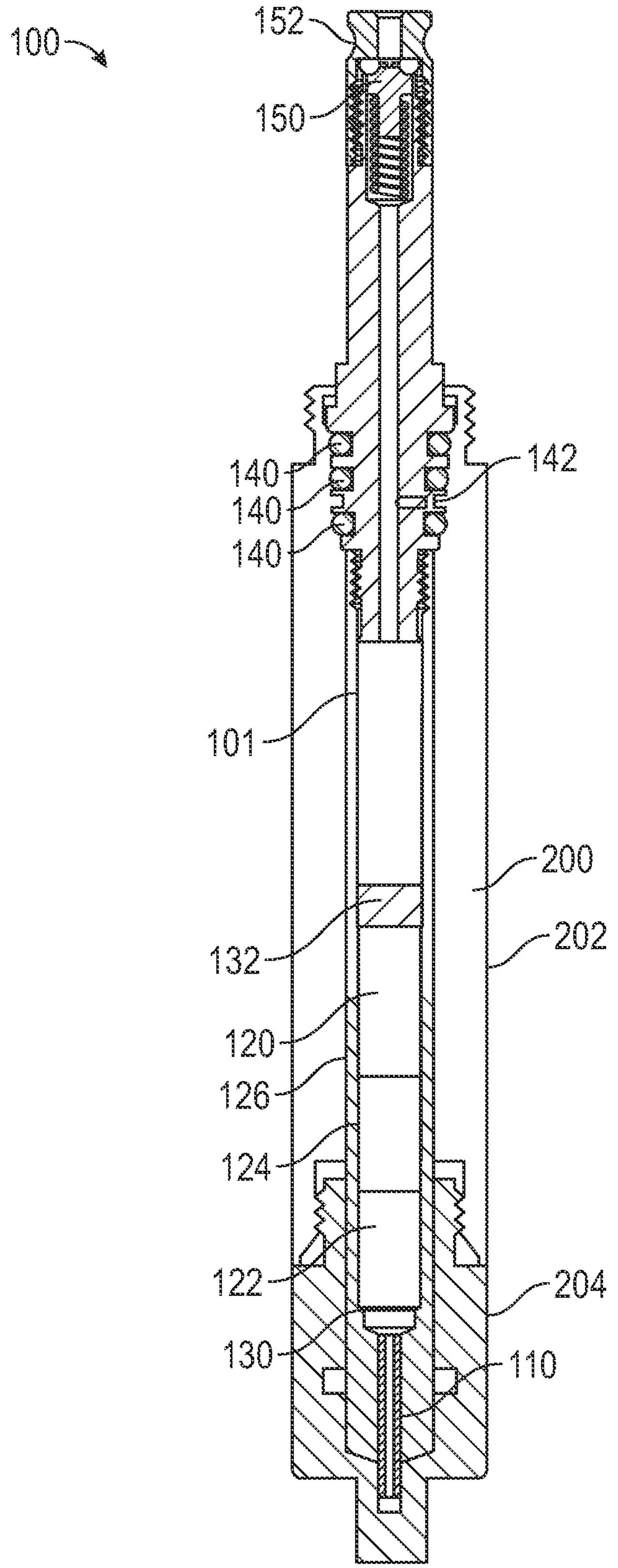
FIG. 2 illustrates the trapping device in an enclosure according to some embodiments of the disclosure.

FIG. 2 illustrates the trapping device 100 in an enclosure 200 according to some embodiments of the disclosure. Enclosure 200 includes sleeve 202 and cap 204, which are threading coupled to each other by threads 206. The inner diameter of enclosure 200 is sized such that o-rings 140 form a seal against the inner surface of sleeve 202 when the trapping device 100 is placed in enclosure 200.

While the trapping device 100 is not in use, such as during transportation to and from the sampling location, cap 204 can be fitted to sleeve 202 to isolate the inner cavity of the body 101 of the sampling device 100 from the external environment of the sampling device. As described above, o-rings 140 form a seal against the inner surface of sleeve 202 to seal the desorption port 142. Cap 204 seals the inlet end of the capillary stage 110 of the sampling device. Valve 150 of the sampling device 100 remains closed, such as due to the force of a spring of the valve, sealing the top of the trapping device 100. Sealing the trapping device 100 in this way prevents contamination of the sampling device 100.

During sampling, cap 204 is removed, allowing air to enter the trapping device 100 through the capillary stage 110, while o-rings 140 and the sleeve 202 continue to seal the desorption port 142. Thus, sample is able to enter the trapping device 100 through the capillary stage 110, but not through the desorption port 142. Removing cap 204 while leaving sleeve 202 in place also prevents contamination of the outside of the sampling device tube 126, such as during handling (e.g., when collecting samples). Removal of sleeve 202 during handling could cause fatty acids, aldehydes, and other contaminants from human contact to be introduced. A metering pump or vacuum reservoir is connected to the detent 152 on top of the trapping system 100 to draw a known volume of air into the trapping system 100 to collect the sample. After sample collection, the cap 204 is replaced. Additionally, the metering pump or vacuum reservoir is disconnected from the detent 152, allowing valve 150 to close. Replacing cap 204 and allowing valve 150 to close prevent contamination of the trapping device 100 during return to the laboratory and while awaiting thermal desorption analysis by GC or GCMS.

Figure 3:
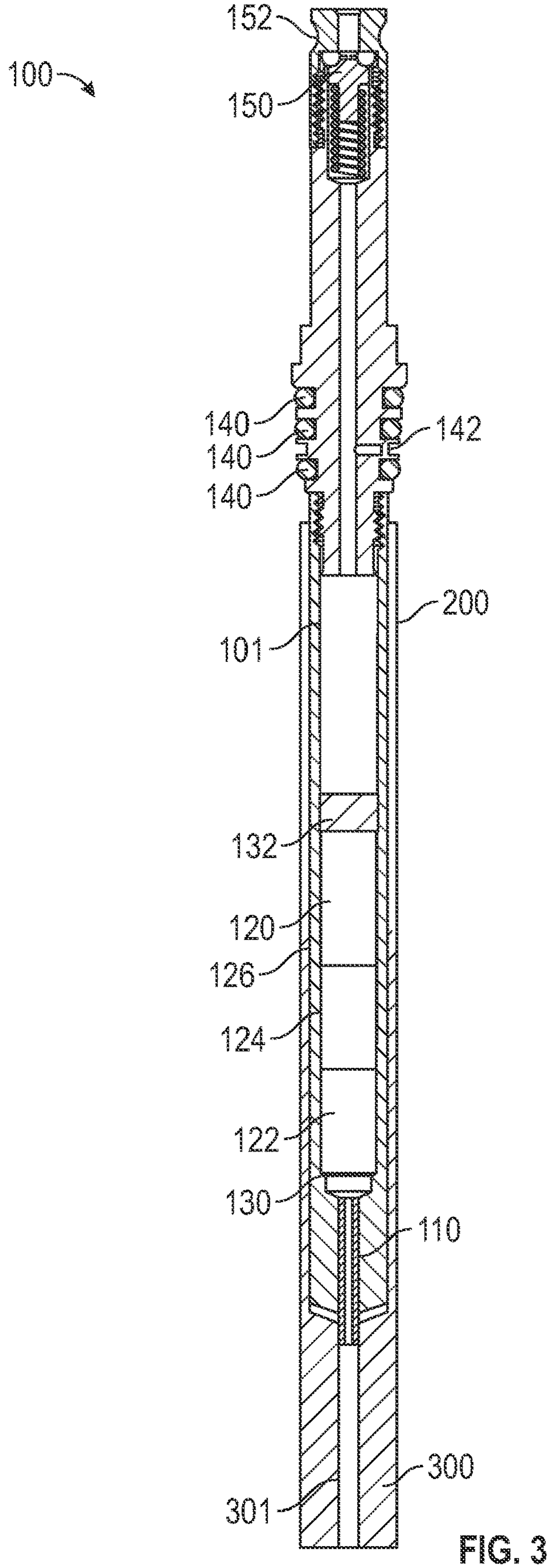
FIG. 3 illustrates the trapping device fitted into the desorption device liner according to some embodiments of the disclosure.

FIG. 3 illustrates the trapping device 100 fitted into the desorption device liner 300 according to some embodiments of the disclosure. During desorption, the trapping device 100 and the desorption device liner 300 are placed inside of a thermal desorption device that is used to back-desorb the sample from the trapping device 100 onto a GC or GCMS. A thermal desorption device is described in more detail below with reference to FIG. 4.

Liner 300 fits around the body 101 of the trapping device 100. Unlike enclosure 200 illustrated in FIG. 2, the liner 300 does not seal the desorption port 142 of the trapping device 100. During desorption, a desorption gas (e.g., an inert carrier gas such as hydrogen or helium) enters the trapping device 100 through the desorption port 142. Liner 300 includes an opening 301 that allows the sample to exit the trapping device 100 for analysis, as will be described in more detail below with reference to FIG. 4.

The liner 300 can be made of inert glass, or from stainless steel that is coated with an inert material, such as a silica coating. The liner 300 keeps the chemical analysis system clean by allowing its replacement after several (or several hundred) cycles of thermal desorption. The ability to insert desorption device 100 into the liner ensures that simply by replacing the liner 300, the capillary stage 110 of the desorption device 100, and occasionally the pre-column 422 (as required in any GC analyzer), a "like-new" flow path can be created for sample analysis. In this way, the performance of a completely new analyzer can be achieved, thus providing the same quality analysis for the life of the chemical analyzer.

Figure 4:
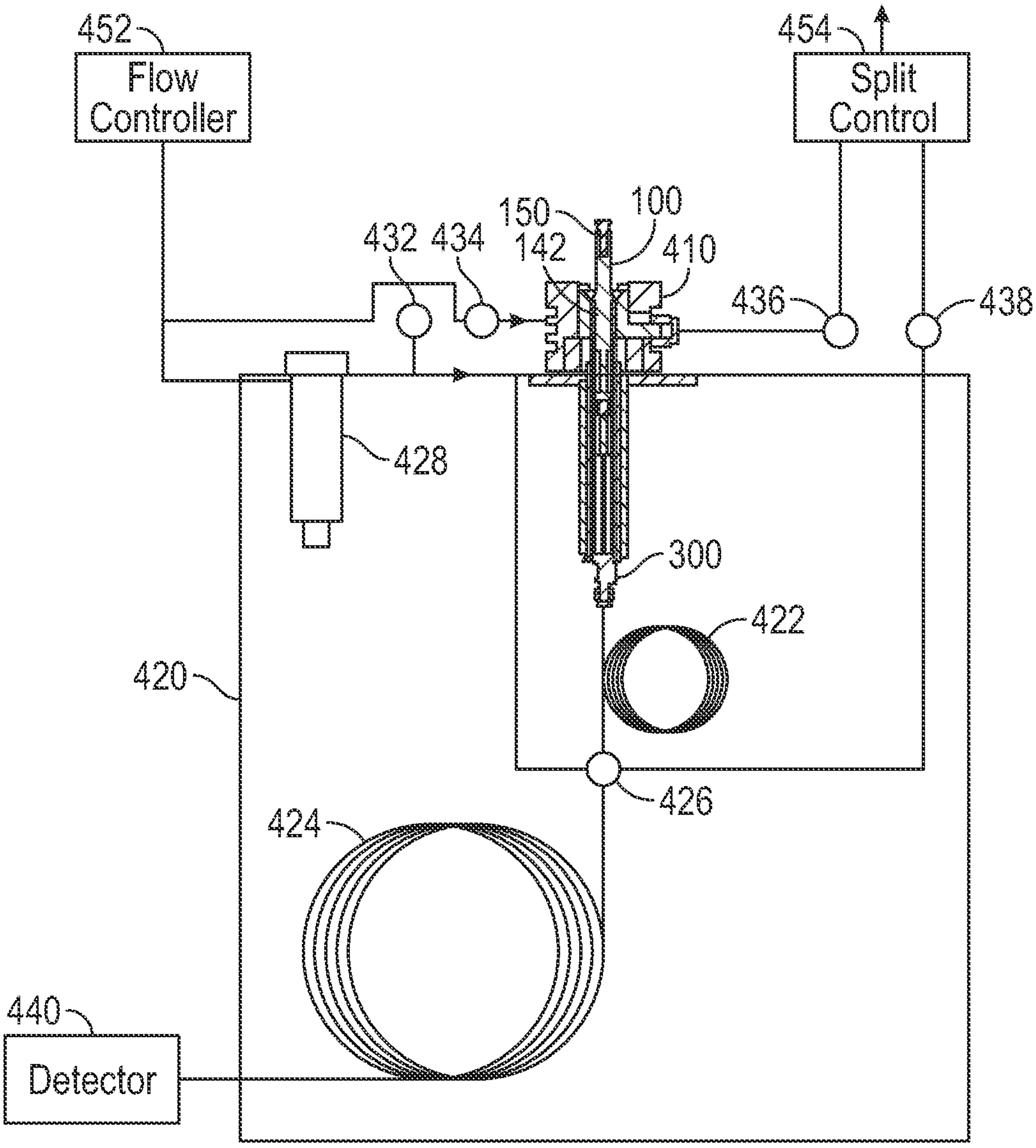
FIG. 4 illustrates the system used to analyze the sample collected in the trapping device according to some embodiments of the disclosure.

FIG. 4 illustrates the system 400 used to analyze the sample collected in the trapping device 100 according to some embodiments of the disclosure. The system 400 includes a thermal desorption device 410, a gas chromatograph 420, a plurality of valves 432-438, detector 440, and flow controllers 452 and 454. The gas chromatograph 420 houses a pre-column 422, another column 424, and carrier fluid (e.g., an inert or non-reactive gas, such as hydrogen or helium) source 428. Flow controller 452 controls the flow rate of carrier fluid 428 through desorption valve 434 to the trapping device 100 and/or the flow rate of carrier fluid 428 through bypass valve 432 to column 424. Split control 454 controls the flow rate from the trapping device 100 through split valve 436 and/or from junction 426 through split valve 438 out of the system 400.

Bypass valve 432 couples the carrier fluid source 428 to a junction 426 between the pre-column 422 and column 424. Desorption valve 432 couples the carrier fluid source to the trapping device 100. Split valve 436 couples the trapping device 100 to split controller 454, allowing compounds to exit the system before pre-column 422. Split valve 438 couples the junction 426 between the pre-column 422 and column 424 to split controller 454, allowing compounds that traversed the pre-column 422 to exit the system before entering column 424. The operation of these valves will be described in more detail below with reference to FIG. 6.

The thermal desorption device 410 is attached on top of the gas chromatograph (GC) 420 to allow the sample to be introduced directly into the GC 420. This arrangement improves recovery of the sample relative to systems that desorb the sample into a remote "conditioning" device that must then deliver the sample through rotary valves and an additional heated line to the GC. The thermal desorption device 410 only exposes the sample to the thermal desorption device liner 300, and the pre-column 422 that can be used to further concentrate the sample after desorption.

During desorption, the thermal desorption device 410 is heated to a desorption temperature in the range of 250-320° C. This heat causes the compounds trapped in trapping device 100 to be released by the sorbents of the trapping device 100, including the packed sorbents in the packed stage and the sorbent coating of the capillary stage. During desorption, split port 438 downstream of the pre-column is opened to increase the flow rate through the trapping device 100 to improve recovery rates of heavier compounds. During desorption, heavy VOCs and all SVOCs are collected on the pre-column 422, with water vapor and lighter compounds being mostly split out between pre-column 422 and column 424 via split port 438.

After desorption is complete, split port 436 is opened to substantially stop any residual compounds left in the trapping device 100 from reaching the pre-column 422, and split port 438 can be closed. In this way, the complete contents of the pre-column 422 are transferred to column 424 as the temperature of GC 420 is ramped to higher temperatures, thereby maximizing the sensitivity of the technique. Later, in some embodiments, bypass valve 432 is opened to enable the flow of carrier fluid 428 through column 424 without flowing through pre-column 422. In yet other embodiments, by opening bypass valve 432 and then opening split valve 436, the pre-column can be backflushed to remove the very heaviest compounds to avoid contamination of the primary analytical column 424. Due to the temperature and flow consistency of today's GC analyzers, this backflush point in the analysis can be very reproducible to ensure all target compounds are recovered, while still optimizing sample throughput as the very heaviest compounds can be backflushed off the pre-column 422 much faster than they can be pushed through the entire length of the main column 424. Compounds eluting from the column 424 are introduced to detector 440. Detector can be a non-specific detector, such as an FID, PID, ECD, FPD, PFPD, PPD, Hall Detector, CLD, or others or a Mass Spectrometer.

Figure 5:
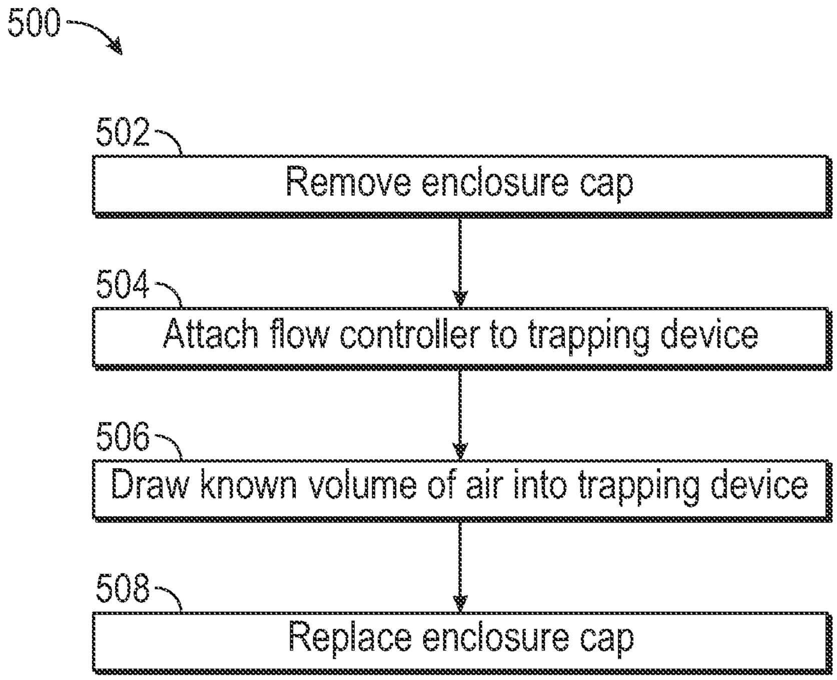
FIG. 5 illustrates a method of collecting a sample in accordance with some embodiments of the disclosure.

FIG. 5 illustrates a method 500 of collecting a sample in accordance with some embodiments of the disclosure. The method 500 can be performed using one or more of the devices, such as trapping device 100, described above with reference to FIGS. 1-4 and performed prior to analysis according to method 600, described below with reference to FIG. 6. Trapping device 100 is portable between the lab and the location in which the sample is to be collected. Thus, one or more steps of method 500 occur at the sampling location. Prior to performing method 500, the trapping device 100 can be transported from another location, such as a lab that conducted a previous analysis using trapping device 100 or a storage location, to the sampling location. After performing method 500, the trapping device 100 can be transported to the lab for analysis or to another location for storage prior to analysis. In some embodiments, a mobile lab can be set up to enable analysis of the sample at the location at which the sample was collected. In some embodiments, one or more steps of method 500 can be automated.

In step 502, while in the environment in which the air is to be sampled, cap 204 of enclosure 200 is removed, exposing the inlet of capillary stage 110 of trapping device 100 to the environment. The sleeve 202 of enclosure 200 remains in place so that desorption port 142 is sealed by o-rings 140 against the inner surface of sleeve 202. In embodiments that utilize automation, a robot removes the cap 204 of the enclosure, such as by lifting the trapping device 100 while retaining the cap 204, thus separating the trapping device 100 from the cap.

In step 504, a metering pump or vacuum source is attached to the trapping device 100 at detent 152. Steps 502 and 504 can be performed in any order or simultaneously. In some embodiments that utilize automation, the metering pump or vacuum source can be attached by a robot or other automated system. Attaching the metering pump or vacuum source at detent 152 of the trapping device 100 causes valve 150 to open, thereby coupling the metering pump or vacuum source to the inner cavity of the body 101 of the trapping device 100.

After steps 502 and 504, the metering pump or vacuum source is used to draw a known volume of air into the trapping device 100 in step 506. Drawing air through the trapping device 100 with the pump or vacuum source causes air to flow into the capillary stage 110 of the trapping device 100, through the capillary stage 110 of the trapping device, into the packed stage 120 of the trapping device, and through the packed stage 120 of the trapping device 110. In other words, a single actuation of the pump or vacuum source can cause the air to flow through both the capillary stage 110 and the packed stage 120 of the trapping system 100. Sampling can occur over a period of time up to one or more weeks. Sampling over one or more days or more weeks allows an analysis of the average concentrations over the sampling period of various compounds to be determined during chemical analysis. For risk assessment, the average concentration over an extended period of time can be more relevant than a quick collection which may be during a short lived low or high concentration episode. In some embodiments that utilize automation, the metering pump or vacuum source can be activated automatically to draw air into the trapping system 100 at a predetermined rate for a predetermined time to draw a known volume of air into the trapping system 100. After sampling is complete, the metering pump or vacuum is removed from the trapping system 100. In some embodiments that utilize automation, the metering pump or vacuum can be removed by a robot or other automated device.

After collecting the sample in step 506, the cap 202 of enclosure 200 can be replaced to seal the inlet of the capillary stage 110 of the trapping device 100 in step 508. The metering pump or vacuum source can also be removed, allowing valve 150 of trapping device 100 to close. In this way, the trapping device 100 is sealed from the external environment during the period of time between collecting the sample and performing chemical analysis as described below in FIG. 6. In some embodiments that utilize automation, the trapping device 100 can be placed in the position of the cap 202 of the enclosure 200 using a robot, autosampler, or other automated device. For example, if the cap 202 is held below the trapping device 100 during trapping, the robot can lower the trapping system 100 towards the cap 202 to replace the cap 202 of the enclosure.

Figure 6:
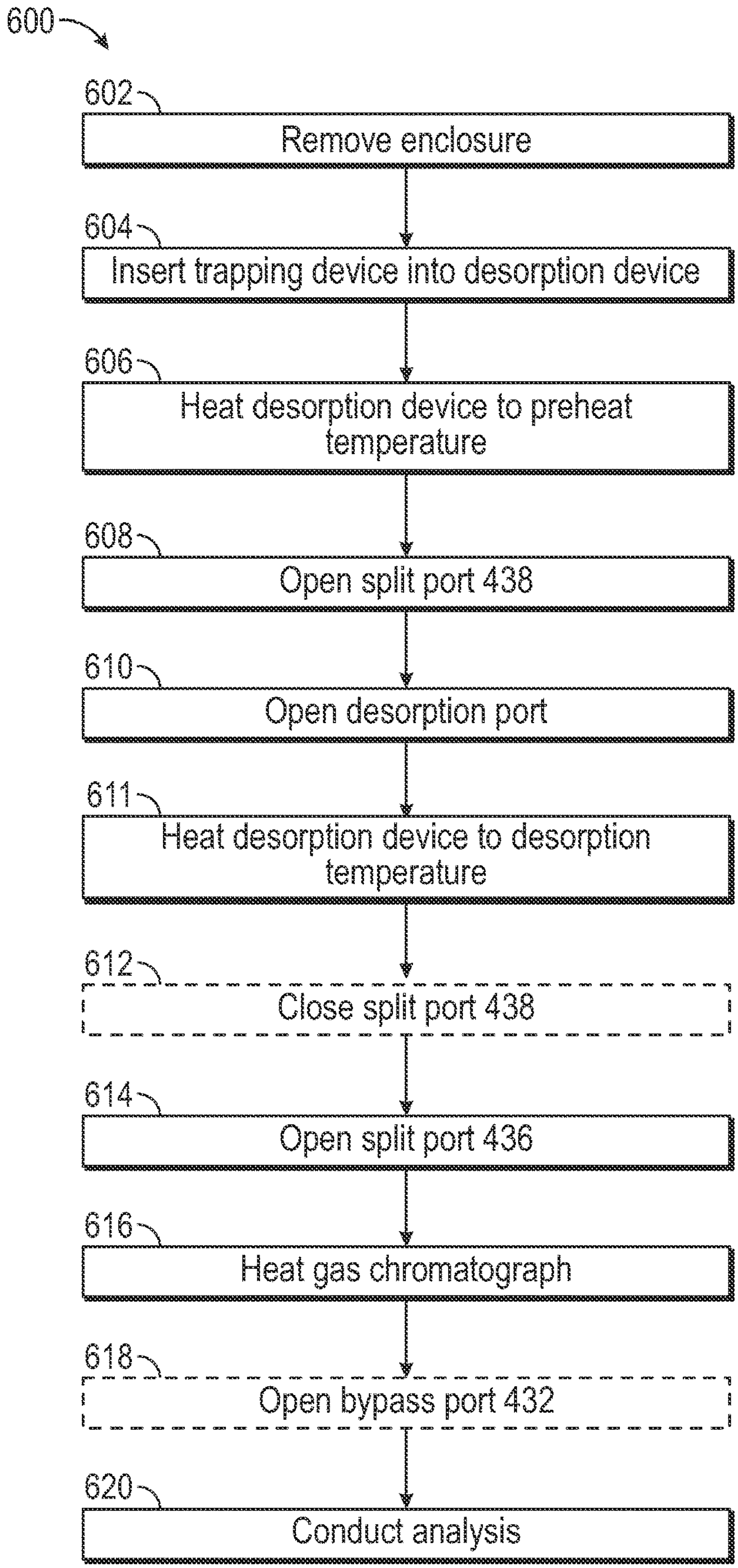
FIG. 6 illustrates an exemplary process of performing chemical analysis on a sample according to some embodiments of the disclosure.

FIG. 6 illustrates an exemplary process 600 of performing chemical analysis on a sample according to some embodiments of the disclosure. The sample can be collected using one or more devices, such as trapping device 100, described above with reference to FIGS. 1-4 and according to method 500 described above with reference to FIG. 5. In some embodiments, one or more steps of method 600 can be automated. For example, a sample preparation rail robotic autosampler can pick up a sample preparation device 100 from a tray of multiple sample preparation devices (e.g., by grabbing the sample preparation device 100 by detent 152) and place the trapping device 100 in thermal desorption device 410 (e.g., step 604, described below). The remaining steps of the method can be controlled by a processor operatively coupled to chemical analysis system 400. After analysis is complete, the robotic autosampler can remove the trapping device 100 from the desorption device and place the trapping device 100 back in the tray with the other trapping devices.

In step 602, enclosure 200 is removed from the trapping device 100, including both sleeve 202 and cap 204. Removing enclosure 200 opens the desorption port 152 and the inlet of the capillary stage 110, allowing carrier fluid and one or more compounds to flow through the trapping device 100.

In step 604, the trapping device 100 is inserted into desorption device 410, which already contains desorption liner 300. This arrangement provides a low volume, inert flow path to the GC column while eliminating the contamination of the desorption device 410 over time. As needed and after multiple uses, the desorption liner 300 can be replaced to provide a new flow path from the trapping device 100 through the desorption device 410.

In step 606, the desorption device 410 is heated to a preheat temperature. The preheat temperature can be in the range of 70-200° C. Heating the desorption device 410 heats the sample contained in the trapping device 100 and causes the compounds of the sample to begin to desorb from the sorbents (e.g., the packed sorbents and the capillary column coating) in the trapping device 100.

In step 608, split port 438 is opened. Opening the split port 438 will increase the flow rate of carrier fluid and trapped compounds through trapping device 100 and into pre-column 422.

In step 610, desorption port 434 is opened to deliver a carrier fluid from carrier fluid source 428 to the trapping device 100. Steps 608 and 610 can be performed in any order, but often simultaneously.

In step 611, the desorption device 410 is heated to a desorption temperature. The desorption temperature is in the range of 250-320° C. Heating the desorption device 410 heats the sample contained in the trapping device 100 and causes the compounds of the sample continue to desorb from the sorbents (e.g., the packed sorbents and the capillary column coating) in the trapping device 100. Step 611 can be performed after or simultaneously with steps 608-610. In some embodiments, preheating can begin prior to steps 608-610, and steps 608-610 can be performed before the desorption device 410 reaches the final preheating temperature (e.g., heating starts, then steps 608-610 are performed while heating continues).

In some embodiments, after a period of time during which one or more compounds transfer from the trapping device 100 to the pre-column 422, split port 438 is closed in step 612. Closing split port 438 enables the system 400 to perform a split less injection of all of the compounds from pre-column 422 to column 424 and into detector 440. Performing a split less injection enables the entire sample to be analyzed, enabling the detector 440 to detect compounds of the sample that have low concentrations. In some embodiments, step 612 is not performed. That is to say, in some embodiments, split port 438 remains open to perform a split injection from pre-column 422 to column 424. Performing a split injection prevents saturation of the detector 440 when analyzing highly-concentrated samples.

In step 614, split port 436 is opened to allow compounds remaining within trapping device 100 to escape the system while the contents of pre-column 422 are transferred to column 424. Split control 454 controls the flow of carrier fluids and any remaining compounds from trapping device 100 out of the system 400.

In step 616, the gas chromatograph 420 is gradually heated to a temperature in the range of 250-330° C. Steps 612, 614, and 616 can be performed in any order or simultaneously. If step 612 is not performed, steps 614 and 616 can be performed in any order or simultaneously.

In some embodiments, in step 618, bypass port 432 is opened to direct the flow of carrier fluid from carrier fluid source 428 to column 424. In some embodiments, step 618 is not performed. In particular, bypass port 432 can allow the backflushing of unwanted, very heavy compounds still on pre-column 422 back out through split port 436 to prevent the need to heat the GC to very high temperature to elute the very heavy compounds (during GC column bakeout), thereby both increasing the lifetime of the GC column, while reducing the runtime of the analysis thereby improving laboratory throughput.

In step 620, the detector 440 conducts the analysis of the sample that elutes from column 424.

After the steps of method 600 are complete, the gas chromatograph 420, desorption device 410, and trapping device 100 remain at an elevated temperature and are baked out to remove any compounds that remain. During bake out, desorption port 434 and split port 436 are opened. Baking out trapping device 100 removes any remaining compounds to prepare the trapping device 100 for re-use without remaining compounds carrying over into the next analysis. As described above, after several uses, the capillary stage 110 of the trapping device 100 and/or the desorption liner 300 can be replaced to create a new flow path from the trapping device 100 through desorption device 410 into pre-column 422.

PFAS compounds (Per- and polyfluoroalkyl substances) have come to the attention of the world scientific community as being dangerous to humans, interacting with human hormonal system, acting as endocrine disruptors, and causing some biological pathways in the human body to be affected. Therefore, there is a need for analytical methods in detecting the levels of the PFAS compounds in different mediums and points of exposure, including but not limited to the analysis of air, water, foods, and potential dermal adsorption from clothing. Many PFAS compounds in air, especially PFAS compounds used to make Per-Fluorinated Alkyl Substances (PFAS) polymers such as Perfluorooctanoic Acid (PFOS), have a low pKa (e.g., pKa ranging from 0 to 2), which cause them to present as salts (e.g., ionic, conjugated bases of their neutral form) in the natural environment. In the air, these compounds are generally adsorbed onto aerosols, particulates, and particles that have a relatively neutral pH (e.g., pH ranging from 4 to 8). Additionally, the CO2 levels in the air tend to lower the pH scale of particles, but not low enough to prevent the deprotonation of acidic compounds. Without preliminary modification of the collected particles, using the trapping system 100 described above, to convert the PFAS compounds to their neutral forms, thermal desorption techniques optionally followed by gas chromatography-mass spectrometry will not be effective in recovering the PFAS salts as they are non-volatile in the ionized state, and they may even undergo decomposition to create other compounds not found in air. In either case, inaccurate results will be obtained.

As mentioned above, it is generally understood that semi-volatile compounds (e.g., and non-volatile compounds) attracted to or attached to particulates, particles, or aerosols can be found within the air (e.g., the air in a laboratory, outside or field environment, etc.). These particles have been classified as either PM2.5, particles with a size of 2.5 micrometers or less, or PM10, which includes particles from 2.5 to 10 micrometers, but the particles can be larger than 10 micrometers, such as dust, pollen, spores, or other biological sources. The heavier semi-volatile and non-volatile compounds in the air can be found on the particles and include ionic species. As the heavier semi-volatile compounds (e.g., and non-volatile compounds including ionic species and others) tend to remain adsorbed onto the particles (e.g., there is not enough energy to free the semi-volatile and non-volatile compounds from being attached to the particles), capturing the particles during a process of collecting air samples will also capture compounds (e.g., semi-volatile and non-volatile compounds) attached to these particles. Examples of such compounds include Per- and polyfluoroalkyl substances (PFAS) that have low pKa values, causing them to exist as non-volatile salts in the environment. In some embodiments, some of the non-volatile compounds, which are particle-bound compounds, can be made to be more volatile based on a post-sampling procedure that converts them to their neutral form. In general, targeted non-volatile salts that may be converted to volatile, neutral compounds present a complication for trapping systems that involve thermal desorption. After being trapped in a capillary stage (e.g., including but not limited to a capillary column) of a trapping system, the ionic species as collected on the particles (e.g., and aerosols) have no vapor pressure and cannot be recovered via thermal desorption conducted, after initial sampling or trapping (e.g., trapping in the field or in a laboratory) of the gas sample and particle-bound compounds (e.g., semi-volatile compounds attached to aerosols) described above, for analysis by gas chromatography-mass spectrometry. However, because the non-volatile salts are bound to particles which are trapped within the capillary column (e.g., and stored for a duration of time of up to one or more weeks until reaching the laboratory for further analysis) through the methods described above, the trapping system of FIG. 1 disclosed herein can be further modified to recover the non-volatile salts (e.g., PFAS salts) Several non-limiting example modifications associated with the recovery of the collected ionized salts will now be discussed.

In some embodiments, a method for conversion of the ionized salts to their neutral, volatile form includes manual acidification followed by thermal desorption. In some embodiments, an acidic solution can be introduced into the capillary stage 110 of the trapping system 100 of FIG. 1. For example, the capillary stage 110 can be dipped in an acidic solution (e.g., pH ranging from 0-1) drawing up the acidic solution into the capillary stage 110 to protonate/neutralize the ionic species of interest (e.g., PFAS). In some embodiments, the desorption port 142 can be sealed above the sorbent 122-126, and the body of the trapping device 100 can be cooled a few degrees during capillary stage 110's exposure to the acidic solution to allow contraction of the one or more gas compounds inside of the packed stage and to allow a minimal volume (e.g., 1-2 microliters) of the acidic solution to be drawn into the capillary stage 110. Doing so ensures that the protonation of the target compounds occurs almost instantly.

Introducing an acidic solution to the trapping device 100 may affect the health of the packed stage, and it may be preferable for the acidic solution to not be drawn into the packed stage 120. In the event that the acidic solution is not pushed through the packed stage 120 and/or the remaining strong and inorganic acidic solution is not backflushed, there will be an elevated risk for losing the semi-volatile or volatile compounds that were made volatile through conversion of their conjugated bases to their neutral forms. However, this risk can be managed through a controlled injection of minimal acidic solution (e.g., 1-2 microliters). In some embodiments, controlling the excess acidic solution can be done through pushing the excess into the packed stage 120. In some embodiments, any water solution in the trapping system 100 can also be pushed through the trapping system asing a flow of clean purge gas (e.g., UHP Nitrogen). The limitations from this technique can be a short lifetime for the trapping system 100. Alternatively, the excess acidic solution is recovered using a blotting technique on a sponge or a cellulose. In other examples, the packed stage 120 can be slightly heated to expand the one or more gas compounds for a few microliters to remove and push the unused excess acid out during the conversion of collected salts to their neutral forms. After the neutralization of the collected salts, the resulting sample can be desorbed and analyzed by Gas Chromatography-Mass Spectrometry. In some embodiments, the manual acidification described above can be instead automated using a rail-based or other automated techniques.

Other methods for recovery of the collected ionic species can include removal of the capillary stage 110 after a sampling event and using other extraction/sample preparation techniques prior to conducting a gas chromatography-mass spectrometry analysis. In some embodiments, these methods can be associated with removing the capillary stage 110 and transferring it to a small vial (e.g., 0.3-1 ml) that includes an acidic solution and a non-water soluble solvent. In some embodiments, the small vial can be agitated/sonicated to mix the acid and solvent layers. In some embodiments, due to the short length of the capillary stage 110, the acidic solution pushes into the tube and causes the release of the trapped ionic species. These species will be soluble in water, but when exposed to the acid, they will enter into the solvent layer, while the inorganic acid remain separated from the solvent layer. The resulting solvent extract can be analyzed directly by Gas or Liquid Chromatography using low volume or high volume injection techniques (e.g., PTV injectors or Full Evaporative Vacuum Extraction). Alternatively, the extraction of the ionized salts using water or a polar solvent can be done without conversion to the neutral form, followed by Liquid Chromatography analysis which does not require compounds to be volatile.

Figure 7A:
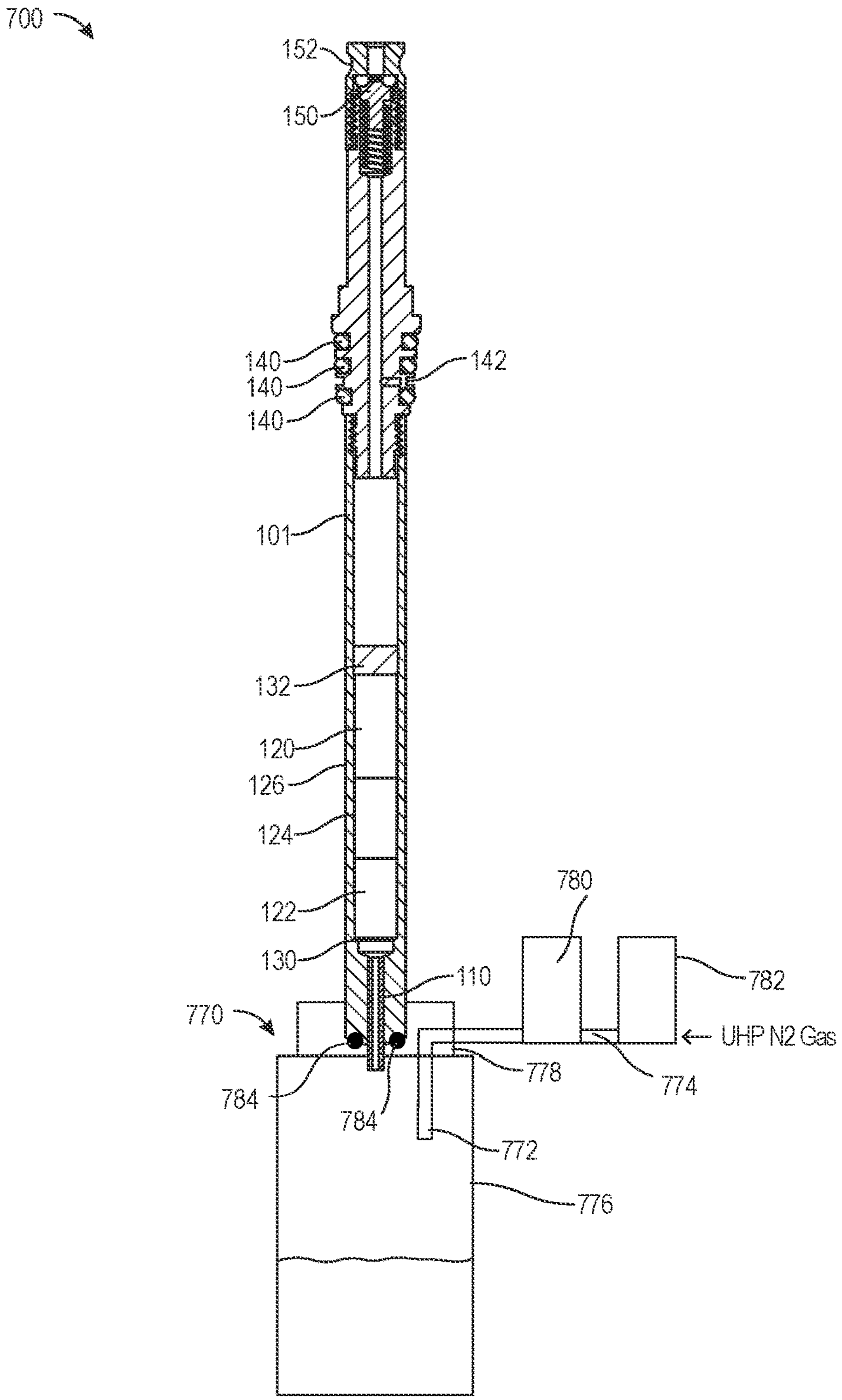
FIG. 7A illustrates a pH adjusting device for neutralizing ionic salts contained on or within particles trapped on the capillary stage, using an inner cavity or body attached to a housing according to some embodiments of the disclosure.

FIG. 7A illustrates a pH adjusting device for neutralizing ionic salts contained on or within particles trapped on the capillary stage, using an inner cavity or body attached to a housing according to some embodiments of the disclosure. In some embodiments, the pH adjusting device 700 includes a trapping system equivalent to the trapping system 100 of FIG. 1. Like reference numbers in FIG. 7A refer to the same parts described above with reference to FIG. 1. In some embodiments, the pH adjusting device 700 further includes a housing 770 attached at the inlet of the capillary stage 110. In some embodiments, the pH adjusting device 700 prolongs the lifetime of the capillary/packed trap by a controlled introduction of an acidic solution. In some embodiments, the housing 770 includes attachment 778 with seal 784 for sealing the connection of the pH adjusting device 700 (at the inlet of capillary stage 110) to a container 776 that may contain strong acids (e.g., 1M HCl). The housing 770 can be further connected to inlet 772, and the inlet 772 is sequentially connected to an acid spike valve 780, spike volume inlet 774, and a pre-load valve 782.

After the initial sampling of the gas sample and particle-bound compounds using sampling device 100, and prior to the thermal desorption process (e.g., or processes) described above, the housing 770, including inlet 772 (e.g., or syringe), acid spike valve 780, small volume inlet 774, and pre-load valve 782 spike can be attached to the pH adjusting device 700 using attachment 778 including seal 784. Container 776 includes a strong acid (e.g., 1M HCl) with an intentional space left empty. Since many strong acids (e.g., HCl) are also volatile, the headspace will become saturated with HCl+H2O vapor, which allows a gas phase spiking opportunity by introducing only a sufficient amount of acidic solution for converting (e.g., protonating the low pKa compounds adsorbed onto the particles) small quantities of ionized chemicals (e.g., nanograms to micrograms). Two micro-solenoid valves (e.g., acid spike valve 780 and preload valve 782) control the amount of acidic vapor introduced into the capillary stage 110 of trapping system 700 without transferring or exposing the micro-solenoid valves 780 and 782 to the acid vapor. The two micro-solenoid valves 780 and 782 are inline with one another with an intervening small volume inlet 774 placed between them. The preload valve 782 can be opened to charge the small volume 774 (e.g., a few to several microliters) with a small amount of positive Nitrogen pressure (e.g., 0.2 to 3 psig). After charging, the preload valve 782 can be closed and acid spike valve 780 can be opened to introduce gas to the container 776, increasing the pressure in container 776 and transferring the gas state acid into the capillary stage 110 of trapping device 700. The saturating conditions of the container 776 ensures that the acid gas will partially condense on the walls of the capillary stage 110, resulting in the conversion of the conjugated bases to the neutral, volatile forms of the trapped compounds (e.g., conversion of Perfluorooctanoic Acid, PFOA, and other PFAS acid compounds to their neutral form).

Figure 7B:
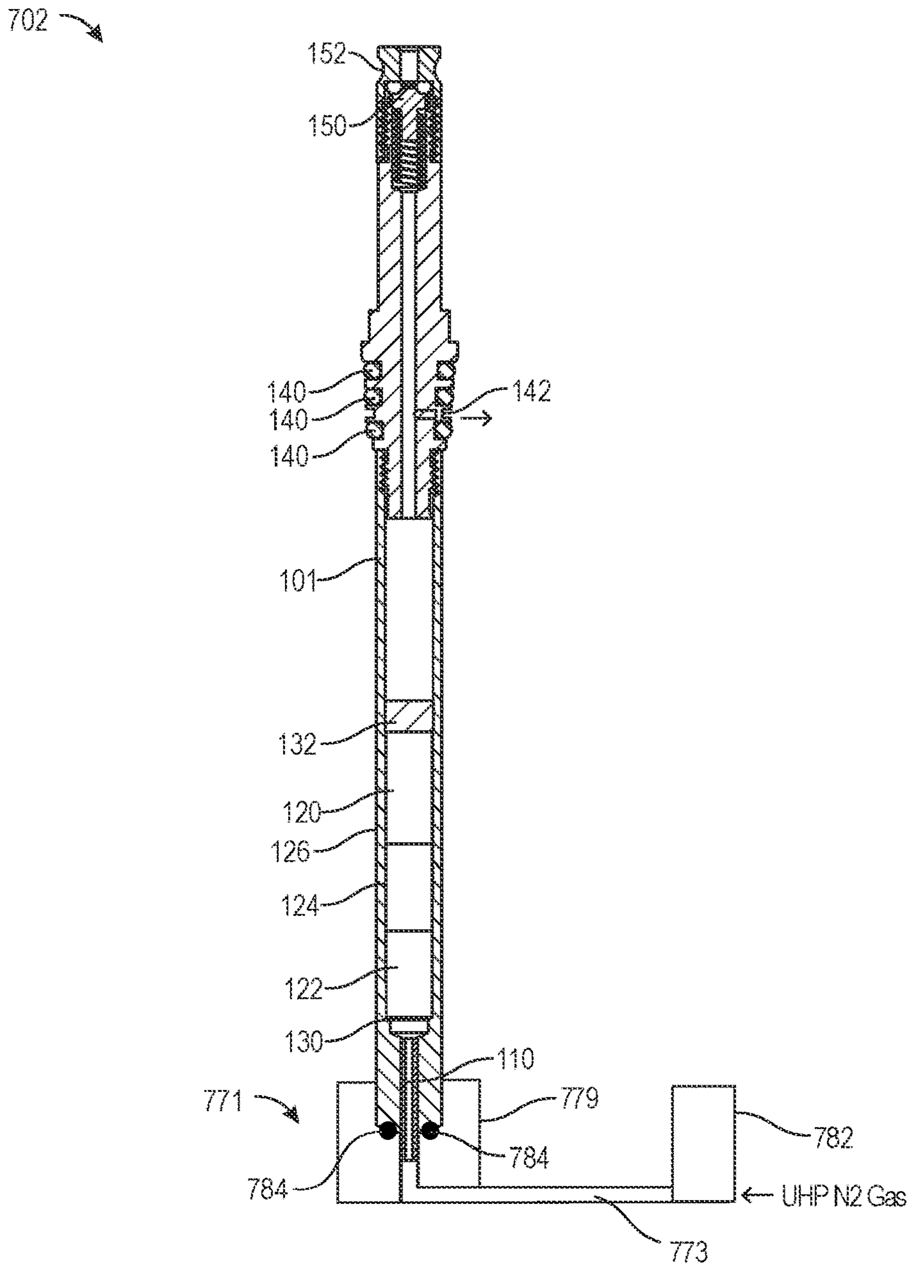
FIG. 7B illustrates a purge device for removing excess pH adjusting acidic compounds prior to thermal desorption, using an inner cavity or body attached to a housing according to some embodiments of the disclosure.

The stoichiometry of introducing a few microliters of saturated acidic gas sample to the capillary stage 110 favors a conversion of the collected PFAS acids to their neutral form, after which the excess acid vapor can be purged through the cooled packed stage 120, at low temperatures to reduce the potential for unintended reactions (e.g., eliminated or purged through the sampling system 100 to avoid the presence of inorganic solution in the sampling device 100 during thermal desportion), as described below with reference to FIG. 7B.

FIG. 7B illustrates a purging device for removing excess pH adjusting acidic compounds prior to thermal desorption, using an inner cavity or body attached to a housing according to some embodiments of the disclosure. In some embodiments, the collected salts once conterted to their neutral form can be recovered during thermal desorption (e.g., in addition to other trapped compounds in the packed stage 120). In some embodiments, the purging device 702 includes a trapping system equivalent to the trapping system 100 of FIG. 1. Like reference numbers in FIG. 7B refer to the same parts described above with reference to FIG. 1. The purging device 702 further includes a housing 771 attached at the inlet of the capillary stage 110. The housing 771 includes attachment 779 with seal 784 for sealing the connection of the purging device 702 (at the inlet of capillary stage 110) to gas line 773.

After spiking of the strong acid gas and conversion of salts to neutral compounds as described above with reference to FIG. 7A, excess acid can be pushed through the sampling device as shown in FIG. 7B. An inlet end of the acid purge valve 782 (e.g., to the right of acid purge valve 782 as shown in FIG. 7B) is coupled to a supply of purge gas, such as N2 gas. A small amount of gas (e.g., 1 to 50 mL) is introduced to sampling device 702 through acid purge valve 782. The gas enters the capillary stage 110 through the inlet to the capillary stage 110 and excess gas flows out through port 142. In this way, excess volatile acid is removed from the sampling device 702 before thermal desorption. Removing excess acid from the sampling device 702 prior to thermal desorption reduces the possible reaction with other compounds of interest in the sample and the extent of damage the excess acid may otherwise cause. Once the excess acid is purged using purging device 702, the housing 771 can be removed, and the remaining trapping system 100 can either be immediately analyzed by thermal desorption/GCMS, or it can be placed back in its isolation sleeve for hours or even days until analysis.

As described herein, the capillary stage 110 can be exchanged and replaced after one or several uses. An alternative to acid exposure and direct thermal desorption would be to remove the capillary stage 110 and perform the elution of the collected salts either directly into an LCMS or the compounds can be eluted using water or another polar solvent. Eluting the salts directly into an LCMS can analyze collected compounds in their ionized form. Eluting the compounds using water or another polar solvent can include eluting the compounds into a vial to perform the pH adjustment (e.g., using acid). Following pH adjustment, transfer into a non-water miscible solvent can take place, followed by injection of some, most, or nearly all of the solvent extract using normal GC solvent injection volumes (e.g. —1 ul), or by using large solvent volume injection techniques (50-500 ul), such as PTV injectors or Full Evaporative Vacuum Extraction (FEVE). Alternatively, the resulting solvent can be concentrated using Full Evaporative Vacuum Extraction whereby the entire contents of the solvent extract can be analyzed for maximum sensitivity.

Detection Limits for the Disclosure

Detection limits depend on the volume of air collected, and the sensitivity of the detector 440. Lately, mass spectrometry has seen a large increase in sensitivity in commercially available systems, such that a 1 liter air sample can produce quantitative measurements sufficient for analyzing compounds including pesticides, Poly Aromatic Hydrocarbons (PAHs), Phthalates, Endocrine Disrupters, Chemical Warfare Agents (CWA), Poly Chlorinated Biphenyls (PCBs), PCDDs, PBDDs, Phenols, air-borne THC and other Cannabinoids, and other chemicals down to 1-3 parts per trillion. In some situations, between 0.01-10 liters of sample can be collected. For example, sampling at a rate of 1 cc/min for 24 hours enables the system to collect 1.44 liters of sample and sampling at this rate for a week enables the system to collect around 10 liters of sample. Using Selective Ion Monitoring modes (SIM) or Triple Stage Quadrupole targeted analysis, detection limits another ten times lower are possible (e.g., 0.01-0.1 parts per trillion depending on collection 10 or 1 liter of sample). Higher-end mass spectrometers such as the Orbitrap or Time of Flight MS (TOF-MS) can provide both targeted quantitative analysis and non-targeted qualitative identification of unknown compounds in a sample using high resolution, full scan operation and spectral deconvolution to report concentrations below 0.1 part per trillion when analyzing 1 liter of sample. Due to the non-volatile nature of the ionized PFAS compounds bound to collected particles, the collection of 10-100 liters can be possible, which allows achieving lower detection limits if necessary. The ability to perform these sample collections over days or weeks at a constant sampling rate can allow a single analysis to determine the average risk factor for a population working or living in these areas. As most of the risk associated with SVOC and PFAS exposure in ambient and indoor air is believed to be chronic in nature, the sum total exposure over long periods of time is a primary factor contributing to the risk of contracting cancer or other diseases or health related conditions.

Uses of the Disclosure

Embodiments of the disclosure improve the accuracy and ease of collecting compounds in the range of C4-C30 in gas phase samples. In particular, compounds in ambient and indoor air can be collected using a pump or other metering device to draw a known volume through the trapping system 100. These metering devices can draw air into the traps at varying rates, depending on the length of time integration desired. EPA Methods 8270 and TO13 can be performed using a fraction of the volume needed compared to the volume required when performing solvent extractions. Analysis in the field rather than in the laboratory continues to grow in importance. Embodiments of the disclosure allow for analysis in the field, unlike solvent extraction techniques that require a stationary lab that is set up with equipment such as extraction devices and fume hoods and now expensive solvent recovery systems due to legislation in most areas that prevent dumping of the solvent vapors into the environment. Elimination of solvents during chemical analysis has the advantage of achieving more environmentally-friendly techniques, which are also safer for lab personnel. Other sample types that can benefit from this technology include breath analyzers and other clinical techniques, large volume static headspace analyzers, collection and identification of odors, measurement of chemicals outgassing from industrial and consumer products, and trace fragrance and aroma analysis. Any GC or GCMS application that requires both higher sensitivity and more complete recovery of heavier compounds will benefit from embodiments of the disclosure.

Therefore, according to the above, in some embodiments, a trapping system, comprises a capillary stage, the capillary stage comprising an open tubular capillary column, wherein an interior surface of the open tubular capillary column is coated by a sorbent; a packed stage, the packed stage comprising a packed sorbent, the packed stage fluidly coupled to the capillary stage; a body, the body comprising: an interior cavity containing the packed sorbent; and a desorption port fluidly coupled to the interior cavity; and a valve attached to the body of the trapping system, wherein the valve is configured to fluidly couple an opening of the body to a pump when the pump is attached to the valve, the opening of the body fluidly coupled to the interior cavity of the body, the opening of the body being different from the desorption port of the body. Additionally or alternatively, in some embodiments, the packed sorbent includes a first packed sorbent and a second packed sorbent and the trapping system further comprises a screen between the first packed sorbent and the second packed sorbent. Additionally or alternatively, in some embodiments, the trapping system is configured to be inserted into an isolation enclosure that isolates the trapping system from an environment of the trapping system. Additionally or alternatively, in some embodiments, the desorption port is configured to accept a carrier fluid during desorption of a sample from the trapping system. Additionally or alternatively, in some embodiments, during desorption of the sample from the trapping system: first compounds are desorbed from the capillary stage, second compounds are desorbed from the packed stage, and accepting the carrier fluid causes the first compounds to flow from the capillary stage into a pre-column and accepting the carrier fluid causes the second compounds to flow from the packed stage, through the capillary stage and into the pre-column. Additionally or alternatively, in some embodiments, the valve comprises a spring that applies a first force that closes the valve in the absence of a second force on the valve, and the pump applies the second force when the pump is attached to the valve. Additionally or alternatively, in some embodiments, the trapping system includes a first retaining screen; and a second retraining screen, wherein the packed sorbent is disposed between the first retaining screen and the second retaining screen and the packed sorbent is in contact with the first retaining screen and the second retaining screen. Additionally or alternatively, in some embodiments, the open tubular capillary column is configured to be removed and replaced with a second open tubular capillary column, wherein one or more particles are adhered to the open tubular capillary column and removing the open tubular capillary column removes the one or more particles. Additionally or alternatively, in some embodiments, the trapping system is portable and collecting a sample with the trapping system comprises transporting the trapping system to a sampling location different from an analysis location at which analysis of the sample is performed. Additionally or alternatively, in some embodiments, analysis of a sample trapped by the trapping system is fully or partially automated. Additionally or alternatively, in some embodiments, collection of a sample with the trapping system is fully or partially automated over a period of time ranging from one hour to one week. Additionally or alternatively, in some embodiments, the capillary stage retains one or more particles collected by the trapping system, and the one or more particles are not transferred to the packed stage.

In some embodiments, a method for trapping a sample for chemical analysis comprises drawing the sample through a trapping system using a pump, the sample comprising first compounds and second compounds, the trapping system comprising a capillary stage and a packed stage, wherein drawing the gas sample using the pump comprises: drawing the first compounds and the second compounds into the capillary stage of the trapping system, the capillary stage comprising an open tubular capillary column, wherein an interior surface of the open tubular capillary column is coated by a sorbent; trapping the first compounds in the capillary stage of the trapping system; drawing the second compounds into the packed stage of the trapping system, the packed stage comprising a packed sorbent; and trapping the second compounds in the packed stage of the trapping system, wherein: the trapping system comprises a body, the body comprising: an interior cavity containing the packed sorbent; and a desorption port fluidly coupled to the interior cavity; drawing the gas sample through the trapping system includes attaching the pump to a valve attached to the body of the trapping system, wherein attaching the pump to the valve causes the valve to fluidly couple the pump to an opening of the body, the opening of the body fluidly coupled to the interior cavity of the body, the opening of the body being different from the desorption port of the body. Additionally or alternatively, in some embodiments, the packed sorbent includes a first packed sorbent and a second packed sorbent and the trapping system further comprises a screen between the first packed sorbent and the second packed sorbent. Additionally or alternatively, in some embodiments, the method further includes after drawing the gas sample through the trapping system, inserting the trapping system into an isolation enclosure that isolates the trapping system from an environment of the trapping system. Additionally or alternatively, in some embodiments, the desorption port is configured to accept a carrier fluid during desorption of a sample from the trapping system. Additionally or alternatively, in some embodiments, the method further includes during desorption of the sample from the trapping system: desorbing the first compounds from the capillary stage; desorbing the second compounds from the packed stage, wherein accepting the carrier fluid causes the first compounds to flow from the capillary stage into a pre-column and accepting the carrier fluid causes the second compounds to flow from the packed stage, through the capillary stage and into the pre-column. Additionally or alternatively, in some embodiments, the valve comprises a spring that applies a first force that closes the valve in the absence of a second force on the valve, and the pump applies the second force when the pump is attached to the valve. Additionally or alternatively, in some embodiments, the trapping system further comprises: a first retaining screen; and a second retraining screen, wherein the packed sorbent is disposed between the first retaining screen and the second retaining screen and the packed sorbent is in contact with the first retaining screen and the second retaining screen. Additionally or alternatively, in some embodiments, the method further includes removing the open tubular capillary column and replacing the open tubular capillary column with a second open tubular capillary column, wherein one or more particles are adhered to the open tubular capillary column and removing the open tubular capillary column removes the one or more particles. Additionally or alternatively, in some embodiments, the trapping system is portable and trapping the sample with the trapping system comprises transporting the trapping system to a sampling location different from an analysis location at which analysis of the sample is performed. Additionally or alternatively, in some embodiments, analysis of a sample trapped by the trapping system is fully or partially automated. Additionally or alternatively, in some embodiments, collection of a sample with the trapping system is fully or partially automated over a period of time ranging from one hour to one week. Additionally or alternatively, in some embodiments, the capillary stage retains one or more particles collected by the trapping system, and the one or more particles are not transferred to the packed stage.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed as new and desired to be protected by Letters Patent of the United States is:

1. A field-portable trapping system, comprising:

a capillary stage, the capillary stage comprising an open tubular capillary column and a first inlet for receiving a sample including a gas sample and one or more particles including one or more heavy compounds, wherein an interior surface of the open tubular capillary column is coated by a polymer coating having an affinity for one or more compounds within the sample and the capillary stage traps one or more ionic species within the one or more particles;

a packed stage, the packed stage comprising a packed sorbent, the packed stage fluidly coupled to the capillary stage;

a body, the body comprising:

an interior cavity containing the packed sorbent; and a desorption port fluidly coupled to the interior cavity, wherein at least a portion of the capillary stage is enclosed by the body; and a valve integrated with the body of the trapping system, wherein the valve is configured to fluidly couple an opening of the body to a pump when the pump is attached to the valve to collect the gas sample, the opening of the body fluidly coupled to the interior cavity of the body, the opening of the body being different from the desorption port of the body and the first inlet of the capillary column.

2. The trapping system of claim 1, wherein the one or more ionic species are converted to non-ionic and volatile compounds after being trapped at the capillary stage.

3. The trapping system of claim 1, wherein the desorption port is configured to accept a carrier fluid during desorption of a sample from the trapping system.

4. The trapping system of claim 3, wherein:

during desorption of the sample from the trapping system:

one or more first compounds are desorbed from the capillary stage, one or more second compounds are desorbed from the packed stage, and accepting the carrier fluid causes the first compounds to flow from the capillary stage into a pre-column and accepting the carrier fluid causes the second compounds to flow from the packed stage, through the capillary stage and into the pre-column.

5. The trapping system of claim 1, wherein the valve comprises a spring that applies a first force that closes the valve in the absence of a second force on the valve, and the pump applies the second force when the pump is attached to the valve.

6. The trapping system of claim 1, further comprising:

a first retaining screen; and a second retraining screen, wherein the packed sorbent is disposed between the first retaining screen and the second retaining screen and the packed sorbent is in contact with the first retaining screen and the second retaining screen.

7. The trapping system of claim 1, wherein analysis of a sample trapped by the trapping system is fully or partially automated.

8. The trapping system of claim 1, wherein collection of a sample with the trapping system is fully or partially automated over a period of time ranging from one hour to one week.

9. The trapping system of claim 1, wherein the capillary stage retaining one or more particles collected by the trapping system reduces contamination and improves recovery of compounds during analysis.

10. The trapping system of claim 1, wherein the one or more heavy compounds are organic molecule-bound particles.

11. The trapping system of claim 1, wherein the packed sorbent includes one or more packed sorbents, wherein the one or more ionic species are pushed onto the one or more packed sorbents.

12. The trapping system of claim 1, further comprising:

a housing, the housing comprising a second inlet, different from the first inlet, for receiving an acidic solution and a third inlet, different from the first or second inlets, for receiving nitrogen gas, the housing fluidly coupled with the capillary stage, wherein:

the capillary stage is configured to retain the one or more heavy compounds of the sample, the packed stage is configured to retain one or more second compounds of the gas sample, and the housing is coupled to the capillary stage after the capillary stage retains the one or more heavy compounds and prior to a thermal desorption.

13. A method for trapping a sample comprising:

drawing the sample into a trapping system, the sample comprising a gas sample and one or more particles including one or more heavy compounds, the trapping system comprising a capillary stage and a packed stage, wherein drawing the sample using a pump comprises:

drawing the one or more heavy compounds and one or more second compounds of the gas sample into the capillary stage of the trapping system, the capillary stage comprising an open tubular capillary column having a first inlet for receiving the sample, wherein an interior surface of the open tubular capillary column is coated by a polymer coating having an affinity for one or more compounds within the sample and the capillary stage traps one or more ionic species within the one or more particles;

retaining, using the capillary stage, one or more heavy compounds collected by the trapping system;

drawing the one or more second compounds into the packed stage of the trapping system, the packed stage comprising a packed sorbent;

trapping the one or more second compounds in the packed stage of the trapping system; and after retaining one or more heavy compounds at the capillary stage, injecting an acidic solution through a second inlet, different from the first inlet, wherein:

the trapping system comprises a body, the body comprising:

an interior cavity containing the packed sorbent; and a desorption port fluidly coupled to the interior cavity, wherein at least a portion of the capillary stage is enclosed by the body;

drawing the gas sample through the trapping system includes attaching the pump to a valve integrated with the body of the trapping system, wherein attaching the pump to the valve causes the valve to fluidly couple the pump to an opening of the body to collect the sample, the opening of the body fluidly coupled to the interior cavity of the body, the opening of the body being different from the desorption port of the body and the first inlet of the capillary column.

14. The method of claim 13, wherein the one or more ionic species are converted to non-ionic and volatile compounds after being trapped at the capillary stage.

15. The method of claim 13, further comprising after drawing the gas sample through the trapping system, inserting the trapping system into an isolation enclosure that isolates the trapping system from an environment of the trapping system.

16. The method of claim 13, wherein the desorption port is configured to accept a carrier fluid during desorption of a sample from the trapping system.

17. The method of claim 16, further comprising:
during desorption of the sample from the trapping system:
desorbing the one or more heavy compounds from the capillary stage; and
desorbing the one or more second compounds from the packed stage, wherein accepting the carrier fluid causes the first compounds to flow from the capillary stage into a pre-column and accepting the carrier fluid causes the second compounds to flow from the packed stage, through the capillary stage and into the pre-column.

18. The method of claim 13, wherein the valve comprises a spring that applies a first force that closes the valve in the absence of a second force on the valve, and the pump applies the second force when the pump is attached to the valve.

19. The method of claim 13, wherein the trapping system further comprises:
a first retaining screen; and
a second retraining screen, wherein the packed sorbent is disposed between the first retaining screen and the second retaining screen and the packed sorbent is in contact with the first retaining screen and the second retaining screen.

20. The method of claim 13, wherein analysis of the gas sample trapped by the trapping system is fully or partially automated.

21. The method of claim 13, wherein collection of the gas sample with the trapping system is fully or partially automated over a period of time ranging from one hour to one week.

22. The method of claim 13, wherein the capillary stage retaining the one or more heavy compounds collected by the trapping system reduces contamination and improves recovery of compounds during analysis.

23. The method of claim 13, wherein the packed sorbent includes one or more packed sorbents, wherein the one or more ionic species are pushed onto the one or more packed sorbents.

* * * * *